(12) United States Patent
Kalyanasundaram et al.

(10) Patent No.: US 12,282,974 B2
(45) Date of Patent: Apr. 22, 2025

(54) LAND ACQUISITION AND PROPERTY DEVELOPMENT ANALYSIS PLATFORM

(71) Applicant: LandClan Limited, Buckinghamshire (GB)

(72) Inventors: Murali Kalyanasundaram, Buckinghamshire (GB); Marcus Hanke, Buckinghamshire (GB)

(73) Assignee: LandClan Limited, Buckinghamshire (GB)

( * ) Notice: Subject to any disclaimer, the term of this patent is extended or adjusted under 35 U.S.C. 154(b) by 0 days.

(21) Appl. No.: 16/430,910

(22) Filed: Jun. 4, 2019

(65) Prior Publication Data

US 2020/0043110 A1    Feb. 6, 2020

Related U.S. Application Data

(60) Provisional application No. 62/713,280, filed on Aug. 1, 2018.

(51) Int. Cl.
*G06Q 50/163* (2024.01)
*G06Q 50/16* (2024.01)

(52) U.S. Cl.
CPC ......... *G06Q 50/163* (2013.01); *G06Q 50/165* (2013.01)

(58) Field of Classification Search
CPC .... G06Q 50/163; G06Q 50/165; G06Q 50/16; G06F 16/29; G06F 16/9537; Y02P 90/845; Y02P 90/84
See application file for complete search history.

(56) References Cited

U.S. PATENT DOCUMENTS

| | | | | |
|---|---|---|---|---|
| 5,857,174 A | * | 1/1999 | Dugan | G06Q 50/16 705/313 |
| 2004/0260573 A1 | | 12/2004 | Schmitt | |
| 2009/0099954 A1 | * | 4/2009 | Kilby | G06Q 10/06 705/37 |
| 2015/0186910 A1 | * | 7/2015 | Cruickshank | G06Q 30/0205 705/7.34 |
| 2016/0048935 A1 | * | 2/2016 | Martinovic | G06Q 10/06375 705/38 |

(Continued)

FOREIGN PATENT DOCUMENTS

CA    2920968 A1    8/2017

OTHER PUBLICATIONS

International Search Report and Written Opinion mailed Oct. 31, 2019 for International Application No. PCT/IB2019/000704.
(Continued)

*Primary Examiner* — Jan P Mincarelli
(74) *Attorney, Agent, or Firm* — Brown Rudnick LLP; Matthew P. York

(57) ABSTRACT

The invention is directed to systems and methods for providing land acquisition and property development analysis services via a cloud-based platform. The intelligent, digital platform of the present invention deploys unique artificial intelligence algorithms across a centralized repository (i.e., data lake) consisting of data sets from third-party data sources to score, mine, financially model, and provide 3D visualization of any proposed development site or scheme in a geographical area of interest based on user input with an interactive interface provided on the platform.

9 Claims, 30 Drawing Sheets

(56) References Cited

U.S. PATENT DOCUMENTS

2016/0063633 A1* 3/2016 Ross ............... G06Q 40/10
                                                    705/36 T
2018/0025452 A1* 1/2018 Fadeev ............ G06Q 50/165
                                                    705/315
2020/0151744 A1* 5/2020 Chopra ............ G06Q 40/02

OTHER PUBLICATIONS

DataSheet for EstateMaster "Development Feasibility" program, 2 pages.

* cited by examiner

Exemplary Executor Metadata

```xml
<?xml version="1.0" encoding="UTF-8"?>
<InMemoryExecutorMetadata>
    <SourceDatasets>
        <SourceDataset name="amenities">
            <Connection type="postgresql">
                <Params>
                    <Param name="URL" value="jdbc:postgresql:localhost/sourcedataset1" />
                    <Param name="Username" value="sourcedataset1_tester" />
                    <Param name="Password" value="*************" />
                </Params>
            </Connection>
        </SourceDataset>
        <SourceDataset name="environment">
            <Connection type="oracle">
                <Params>
                    <Param name="URL" value="jdbc:oracle:thin:@localhost:1521:ORCL" />
                    <Param name="Username" value="sourcedataset2_tester" />
                    <Param name="Password" value="*************" />
                </Params>
            </Connection>
        </SourceDataset>
        <SourceDataset name="transportation">
            <Connection type="wfs">
                <Params>
                    <Param name="URL" value="https://sample.geoserver.com/wfs?service=WFS&version=1.1.0&request=GetFeature" />
                </Params>
            </Connection>
        </SourceDataset>
    </SourceDatasets>
    <TargetDatasets>
        <TargetDataset name="core">
            <Connection type="postgresql">
                <Params>
                    <Param name="URL" value="jdbc:postgresql:localhost/targetdataset" />
                    <Param name="Username" value="targetdataset_tester" />
                    <Param name="Password" value="*************" />
                </Params>
            </Connection>
        </TargetDataset>
    </TargetDatasets>
</InMemoryExecutorMetadata>
```

FIG. 5

Exemplary Rules Metadata

```xml
1  <?xml version="1.0" encoding="UTF-8"?>
2  <InMemoryRulesMetadata>
3    <Rule>
4      <IF feature-a INTERSECTS feature-b>
5        <IF feature-a WITHIN 5 miles FROM feature-c>
6          <IF feature-a CROSSES feature-d>
7            <CREATE feature-d>
8              <SET geometry=UNION(feature-b, feature-c, feature-d) />
9              <SET highest_score=MAX(feature-b.score, feature-c.score, feature-d.score />
10           </CREATE>
11         </IF>
12       </IF>
13     </IF>
14   </Rule>
15 </InMemoryRulesMetadata>
```

FIG. 6

Exemplary Compression Datasets

```java
 1  package com.landclan.rules.engine.data.manager.model;
 2
 3  import java.io.Serializable;
 9
10  public class EngineObject implements Serializable {
11
12      private static final long serialVersionUID = 1L;
13
14      private String featureName;
15      private long objectId;
16      private Geometry geom;
17      private Map<String, Object> attributes = new HashMap<String, Object>();
18
19      public EngineObject() {
20          //
21      }
22
23      public EngineObject(String featureName, long objectId, Geometry geom, Map<String, Object> attributes) {
24          this.featureName = featureName;
25          this.objectId = objectId;
26          this.geom = geom;
27          this.attributes = attributes;
28      }
```

FIG. 7

Schools Impact Analysis / Reporting

Health Services Impact Analysis / Reporting

LAND ACQUISITION AND PROPERTY DEVELOPMENT ANALYSIS PLATFORM

CROSS-REFERENCE TO RELATED APPLICATIONS

The present application claims the benefit of and priority to U.S. Provisional Application No. 62/713,280, filed Aug. 1, 2018, the content of which is incorporated by reference herein in its entirety.

FIELD OF THE INVENTION

The invention generally relates to land and property development and, more particularly, to a cloud-based platform providing land acquisition and property development analysis services.

BACKGROUND

Land and property development is a business process encompassing activities that range from the renovation and re-lease of existing buildings to the purchase of raw land and the sale of developed land or parcels to others. Real estate developers are the people and companies who coordinate all of these activities, converting ideas from paper to real property. Developers purchase land, finance real estate deals, build or have builders build projects, create, imagine, control, and orchestrate the process of development from the beginning to end.

Developers generally take the greatest risk in the creation or renovation of real estate. Typically, developers purchase a tract of land, determine the marketing of the property, develop the building program and design, obtain the necessary public approval and financing, build the structures, and rent out, manage, and ultimately sell it. Sometimes property developers will only undertake part of the process. For example, some developers source a property and get the plans and permits approved before selling the property with the plans and permits to a builder at a premium price. Alternatively, a developer that is also a builder may purchase a property with the plans and permits in place so that they do not have the risk of failing to obtain planning approval and can start construction on the development immediately.

With the shortage of available and raw land in many parts of the world, particularly in highly developed cities, land acquisition and property development, most notably property redevelopment, is highly attractive. For example, in England and Wales, there are presently in excess of 25 million land parcels registered with the Land Registry. Of those parcels, several million could be redeveloped, thereby improving a given locale and further address housing shortage crisis. However, the process of evaluating and assessing land acquisition and property development opportunities is generally a difficult and time-consuming process.

For example, with regard to redevelopment opportunities, a given land parcel must first be analyzed in detail to determine its suitability for development for a given project. For example, a potential buyer may be interested in redeveloping a site to include residential housing. The analysis of a site may generally include an assessment of whether the site is properly zoned for residential housing and further include a valuation of the site for the planned development (i.e., an estimate of potential return on the investment based on the location of the site and desirability/need for residential housing). At present, such analysis must be carried out manually, typically by a land acquisition agent or analyst, who is tasked with performing the due diligence of a given site, including examination of the dynamics of the property, the market, the items of record, the economics of the deal, as well as the ability to secure needed investors. This is a costly and laborious process for the client or landowner, consuming significant amounts of time and resources, resulting in a significant roadblock to identifying development opportunities.

SUMMARY

The present invention recognizes the drawbacks of current systems and methods of assessing land acquisition and property development and/or redevelopment opportunities, and provides a cloud-based, land acquisition and property development analysis platform to address such drawbacks.

The intelligent, digital platform of the present invention provides an interface with which a user may interact via an associated computing device, such as a smartphone or tablet or PC, wherein the platform provides land acquisition and/or property development analysis services. The platform is deployed via a digital cloud, allowing for users to easily access the platform and obtain detailed analysis of land acquisition and/or property development opportunities in a given geographic area which can be filtered by country, region, city, and/or town. The platform provides an interactive map with which a user may target a specific geographic area to identify land and/or property development/redevelopment opportunities within a desired area. In response to user input, which may include a text search or lasso-type search of a given area of interest, the platform provides a visual rendering of the area of interest, including a visual indication of sites (land and/or properties) located within the geographical area of interest, as well as various characteristics of any given site, including relevant land and/or property data. The land and property data may generally be associated with site attributes and site-specific information, which may include, but is not limited to, details regarding site ownership, listing of buildings or structures provided on the site, pricing information for any buildings or structures, including market values, site-specific planning information, local and national government development policy, road and highway information, amenity information (i.e., nearest shops, restaurants, services, etc.), and details regarding the land (i.e., environmental factors, flood zone, slope, etc.), to name a few. The site attributes and site-specific information is generally retrieved from third-party data sources that may be publicly available or subscription-based.

In addition to site attributes and site-specific information, the platform further provides scoring and categorization functionality. In particular, the platform analyzes the land and/or property data obtained from third party data sources and, based on unique artificial intelligence scoring algorithms, ranks and identifies, by development type, the most viable and highest yielding sites available in any given geographic area. Furthermore, upon the execution of a query from a user, the platform is able to calculate and provide the Gross Development Value (GDV) (i.e., a calculation of what a development property should be worth on the open market) for a given site or combination of sites. The platform is further enabled to provide a complete three-dimensional (3D) visualization of a selected GDV scheme for a given site. The platform is further enabled to provide impact analysis reports concerning various factors when a site is either developed or redeveloped (based on proposals), thereby providing an indication of the impact that a proposed developments have on such factors. The impacted factors may include, for example, road traffic on an existing road network, school capacity, health services capacity, emergency services response time, utility network demand and connection, as well as carbon footprint.

Accordingly, the intelligent, digital platform of the present invention deploys unique artificial intelligence algorithms across a centralized repository (i.e., data lake) consisting of data sets from third-party data sources to score, mine, financially model, and provide 3D visualization of any proposed development site or scheme. The platform essentially collates and provides relevant land and property data available in real, or near-real, time. The platform provides a user with a vast amount of land and property data for any given site in a geographical area of interest, and further provides unique scoring, categorization, impact analysis, and GDV calculations. Accordingly, a user is able to better determine whether any given site within the area of interest is suitable for a given project. As such, the platform of the present invention provides a much more comprehensive analysis of land acquisition and property development opportunities than conventional methods, drastically improving speed and reducing costs compared to conventional due diligence processes.

Certain aspects of the invention relate to a system for providing land acquisition and property development analysis services. The system comprises a cloud-based server configured to communicate and exchange data with one or more computing devices over a network. The cloud-based server comprises a hardware processor coupled to non-transitory, computer-readable memory containing instructions executable by the processor to cause the server to provide a digital platform comprising an interface with which a user can interact via an associated computing device, the digital platform providing land acquisition and property development analysis services. The server is configured to receive session data including user input with the interface, the user input being associated with selection of a geographical area of interest. In response to user input, the server is configured to generate a plurality of processed datasets associated with one or more sites located within the geographical area of interest. Each processed dataset comprises information associated with a characteristic of land and/or property of a given site. The server is further configured to generate a scoring attribute for at least some of the plurality of processed datasets. The scoring attribute corresponds to a ranking of viability of an associated characteristic of land and/or property of a given site relative to characteristics of land and/or property of other sites. The server is further configured to categorize each of the one or more sites based on analysis of at least one or more scoring attributes of each of the one or more sites. In turn, the server is configured to output, via the interface of the platform, a visual rendering of at least one of the one or more sites located within the geographical area of interest, information associated with a characteristic of land and/or property of a given site, scoring attributes for the land and/or property characteristics, and categorization of the one or more sites.

In some embodiments, the digital platform provides a web mapping service and outputs, via the interface, an interactive map of a geographical location. The visual rendering of a geographical location comprises map data and/or imagery of the geographical location. For example, the digital platform outputs, via the interface, an interactive web map comprising at least one of satellite imagery, aerial photography, and street maps and associated land and structures.

In some embodiments, the user selection of the geographical area of interest comprises either a text-based search or a search based on a user-defined boundary on the interactive map. The text-based search may include a search for at least one of an address, geographic coordinates, or a place of interest. The user-defined boundary may include a lasso-type search, wherein the user can simply define, via cursor input or touch-input, a specific area on the map that they are interested in obtaining an analysis of.

The server may generally include a processing engine (i.e., and in-memory processing engine) configured to read one or more datasets from third party sources based on the user selection of the geographical area of interest. The processing engine is further configured to analyze the one or more third party source datasets based, at least in part, on a set of data processing rules and set of scalar and spatial functions to generate the plurality of processed datasets. The third party source datasets comprise data provided by a publicly available or subscription-based data source. For example, the third party source datasets may include, but are not limited to, zip code data, integrated transport network data, national public transport data, national amenities data, national energy performance data, sold house price data, national population data, drive time data, consumer insight and demographic data, care home data, local business data, national landuse data, national topography data, national buildings data, national addressbase data, national roads data, national roadlinks data, national land parcels data, national greenbelt data, national environmental data, and national terrain data.

In some embodiments, each processed dataset may is associated with a corresponding analysis performed via the processing engine for a given site located within the geographical area of interest and comprises information associated with a characteristic of land and/or property of a given site. For example, the analysis may include, but is not limited to, proximity amenities analysis, house prices analysis, demographic and industrial analysis, buildings analysis, road frontage analysis, site creation analysis, environmental analysis, slope analysis, and land use analysis.

The processing engine generates scoring attributes for a given site based, at least in part, on the analyses. The scoring attributes may include, but are not limited to, developed area score, environmental score, flood zone score, listed buildings score, strategic area score, shape score, commercial competitor's score, commercial customer's score, drive time score for house prices, land use score, proximity amenities score, revenue per acre score, road frontages score, and site size score.

The processing engine further categorizes a given site into a defined category of land or property type based on analysis of at least one or more scoring attributes. The categories may include, but are not limited to, housing, social housing, condominium, apartments, affordable apartments, student accommodation, care homes, luxury homes, hotels, industrial, retail, commercial offices, storage, physician or general practitioner, school, restaurants/pubs, gym, car showroom, and car wash.

The server, via the interface of the platform, further provides additional tools/features with which a user can interact so as to provide additional information regarding a site of interest to help the user better determine whether any given site within the area of interest is suitable for a given project. For example, in some embodiments, the server is further configured to generate a gross development value (GDV) calculation for the one or more sites. The processing engine is configured to generate the GDV calculation based, at least in part, on an analysis of one or more processed datasets, scoring attributes, and categorizations performed via the processing engine for a given site. In some embodiments, the server is further configured to output, via the interface, an architectural visualization of potential properties on a given site. The visualization comprises a three-dimensional (3D) rendering of one or more properties on a given site based, at least in part, on user input with the interface, the user input comprising user selected development template.

Another aspect of the invention relates to a computer-implemented method for providing land acquisition and property development analysis services. The method includes providing a specifically-programmed cloud-based server configured to communicate and exchange data with one or more computing devices over a network. The method includes providing, via the sever, a digital platform comprising an interface with which a user can interact via an associated computing device; receiving, via the server, session data including user input with the interface, the user input being associated with selection of a geographical area of interest displayed via the interface. The method further includes generating, via the server, based on the user input, a plurality of processed datasets associated with one or more sites located within the geographical area of interest, wherein each processed dataset comprises information associated with a characteristic of land and/or property of a given site. The method includes generating, via the server, a scoring attribute for at least some of the plurality of processed datasets, wherein the scoring attribute corresponds to a ranking of viability of an associated characteristic of land and/or property of a given site relative to characteristics of land and/or property of other sites and categorize each of the one or more sites based on analysis of at least one or more scoring attributes of each of the one or more sites. The method further includes outputting, via the interface, a visual rendering of at least one of the one or more sites located within the geographical area of interest, information associated with a characteristic of land and/or property of a given site, scoring attributes for the land and/or property characteristics, and categorization of the one or more sites.

In some embodiments, the method includes providing, via the digital platform, a web mapping service and outputting, via the interface, an interactive map of a geographical location, wherein the user selection of the geographical area of interest comprises either a text-based search or a search based on a user-defined boundary on the interactive map.

In some embodiments, the method includes reading, via a processing engine of the server, one or more datasets from third party sources based on the user selection of the geographical area of interest and analyzing, via the processing engine, the one or more third party source datasets based, at least in part, on a set of data processing rules and set of scalar and spatial functions to generate the plurality of processed datasets.

In some embodiments, the method further includes associating each processed dataset with a corresponding analysis performed via the processing engine for a given site located within the geographical area of interest and comprises information associated with a characteristic of land and/or property of a given site. The method further includes generating, via the processing engine, scoring attributes for a given site based, at least in part, on the analyses. The method further includes categorizing, via the processing engine, a given site into a defined category of land or property type based on analysis of at least one or more scoring attributes. The scoring attributes may include, but are not limited to, developed area score, environmental score, flood zone score, listed buildings score, strategic area score, shape score, commercial competitor's score, commercial customer's score, drive time score for house prices, land use score, proximity amenities score, revenue per acre score, road frontages score, and site size score. The categories may include, but are not limited to, housing, social housing, condominium, apartments, affordable apartments, student accommodation, care homes, luxury homes, hotels, industrial, retail, commercial offices, storage, physician or general practitioner, school, restaurants/pubs, gym, car showroom, and car wash.

In some embodiments, the server is further configured to generate a gross development value (GDV) calculation for the one or more sites. Accordingly, in some embodiments, the method further includes generating, via a processing engine of the server, the GDV calculation based, at least in part, on an analysis of one or more processed datasets, scoring attributes, and categorizations performed via the processing engine for a given site.

Yet still, in some embodiments, the method includes outputting, via the interface, an architectural visualization of potential properties on a given site, wherein the visualization comprises a three-dimensional (3D) rendering of one or more properties on a given site based, at least in part, on user input with the interface, the user input comprising user selected development template.

BRIEF DESCRIPTION OF THE DRAWINGS

FIG. 5 is one embodiment of an exemplary set of executor metadata to be read by the in-memory analysis and processing engine consistent with the present disclosure.

FIG. 6 is one embodiment of an exemplary set of rules metadata to be read by the in-memory analysis and processing engine consistent with the present disclosure.

FIG. 7 is one embodiment of an exemplary compression dataset of an engine object processed by the in-memory analysis and processing engine consistent with the present disclosure.

FIG. 9A is a block diagram illustrating proximity amenities analysis. FIG. 9B is a block diagram illustrating house prices analysis. FIG. 9C is a block diagram illustrating demographic and industrial analysis. FIG. 9D is a block diagram illustrating buildings analysis. FIG. 9E is a block diagram illustrating road frontage analysis. FIG. 9F is a block diagram illustrating site creation analysis. FIG. 9G is a block diagram illustrating environmental analysis. FIG. 9H is a block diagram illustrating slope analysis. FIG. 9I is a block diagram illustrating land use analysis.

DETAILED DESCRIPTION

Figure 1:
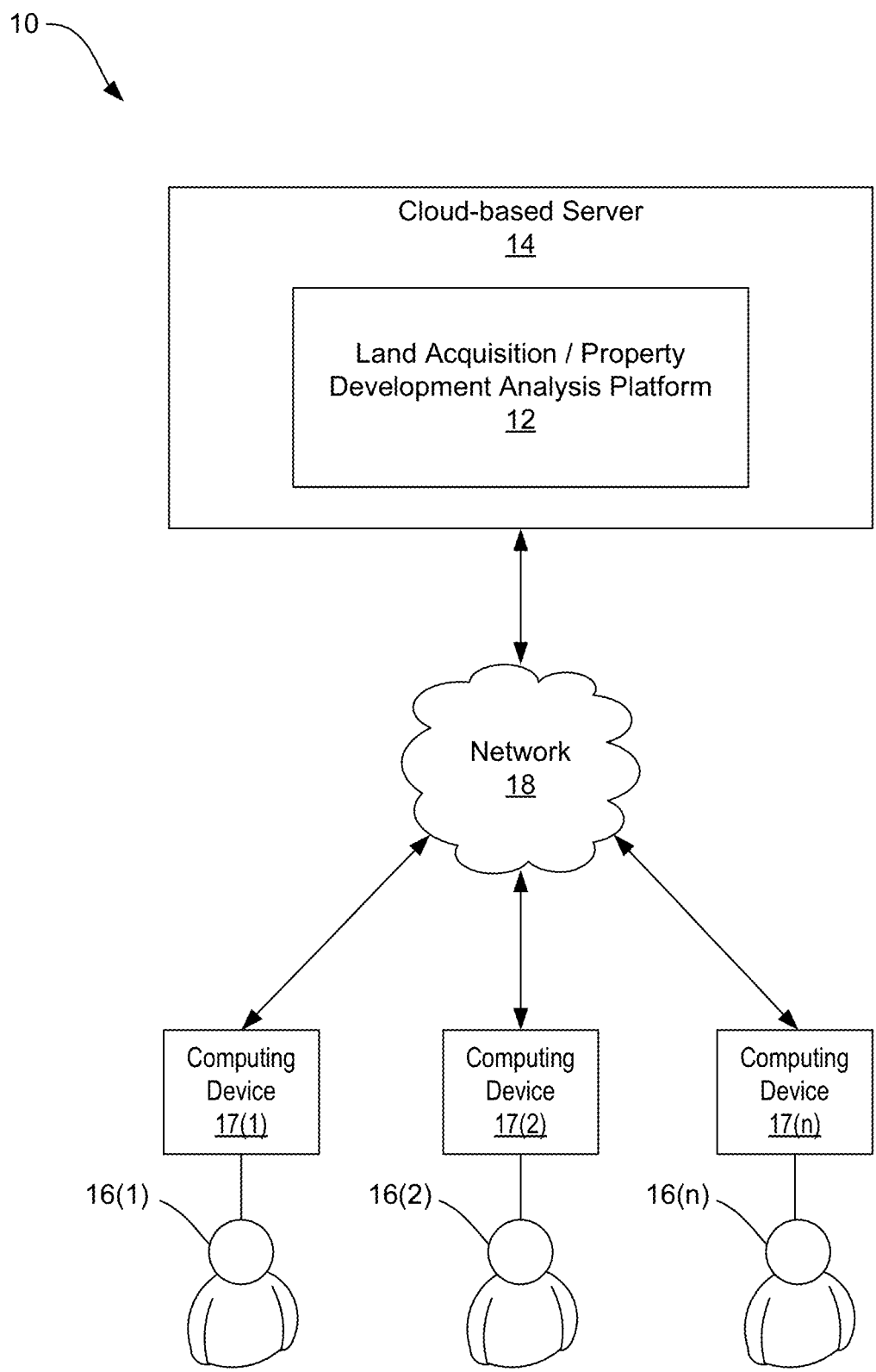
FIG. 1 is a block diagram illustrating one embodiment of an exemplary system for providing land acquisition and property development analysis services.

By way of overview, the present invention is directed to an intelligent, cloud-based platform providing land acquisition and property development analysis services, most notably land acquisition and property development and/or redevelopment opportunities.

The intelligent, digital platform of the present invention provides an interface with which a user may interact via an associated computing device, such as a smartphone or tablet or PC, wherein the platform provides land acquisition and/or property development analysis services. The platform is deployed via a digital cloud, allowing for users to easily access the platform and obtain detailed analysis of land acquisition and/or property development opportunities in a given geographic area which can be filtered by country, region, city, and/or town. The platform provides an interactive map with which a user may target a specific geographic area to identify land and/or property development/redevelopment opportunities within a desired area. In response to user input, which may include a text search or lasso-type search of a given area of interest, the platform provides a visual rendering of the area of interest, including a visual indication of sites (land and/or properties) located within the geographical area of interest, as well as various characteristics of any given site, including relevant land and/or property data. The land and property data may generally be associated with site attributes and site-specific information, which may include, but is not limited to, details regarding site ownership, listing of buildings or structures provided on the site, pricing information for any buildings or structures, including market values, site-specific planning information, local and national government development policy, road and highway information, amenity information (i.e., nearest shops, restaurants, services, etc.), and details regarding the land (i.e., environmental factors, flood zone, slope, etc.), to name a few. The site attributes and site-specific information is generally retrieved from third-party data sources that may be publicly available or subscription-based.

In addition to site attributes and site-specific information, the platform further provides scoring and categorization functionality. In particular, the platform analyzes the land and/or property data obtained from third party data sources and, based on unique artificial intelligence scoring algorithms, ranks and identifies, by development type, the most viable and highest yielding sites available in any given geographic area. Furthermore, upon the execution of a query from a user, the platform is able to calculate and provide the Gross Development Value (GDV) (i.e., a calculation of what a development property should be worth on the open market) for a given site or combination of sites. The platform is further enabled to provide a complete three-dimensional (3D) visualization of a selected GDV scheme for a given site. The platform is further enabled to provide impact analysis reports concerning various factors when a site is either developed or redeveloped (based on proposals), thereby providing an indication of the impact that a proposed developments have on such factors. The impacted factors may include, for example, road traffic on an existing road network, school capacity, health services capacity, emergency services response time, utility network demand and connection, as well as carbon footprint.

Accordingly, the intelligent, digital platform of the present invention deploys unique artificial intelligence algorithms across a centralized repository (i.e., data lake) consisting of data sets from third-party data sources to score, mine, financially model, and provide 3D visualization of any proposed development site or scheme. The platform essentially collates and provides relevant land and property data available in real, or near-real, time. The platform provides a user with a vast amount of land and property data for any given site in a geographical area of interest, and further provides unique scoring, categorization, impact analysis, and GDV calculations. Accordingly, a user is able to better determine whether any given site within the area of interest is suitable for a given project. As such, the platform of the present invention provides a much more comprehensive analysis of land acquisition and property development opportunities than conventional methods, drastically improving speed and reducing costs compared to conventional due diligence processes.

FIG. 1 illustrates one embodiment of an exemplary system 10 consistent with the present disclosure. As shown, system 10 includes a land acquisition and property development analysis platform 12 embodied on an internet-based computing system/service. For example, as shown, the land acquisition and property development analysis platform 12 may be embodied on a cloud-based server 14, for example. The land acquisition and property development analysis platform 12 is configured to communicate and share data, specifically land and property analysis data, with one or more users 16(1)-16(n) via user computing devices 17(1)-17(n) over a network 18. In the present context, the users are generally subscribers to the land acquisition and property development analysis services provided by the platform 12 and are thereby seeking land acquisition and property development and/or redevelopment opportunities.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the computing devices 17 and/or between the computing devices 17 and the cloud-based server 14, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of October 2018, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The land acquisition and property development analysis platform 12 is configured to communicate and share data with the computing devices 17 associated with one or more users 16. Accordingly, the computing device 17 may be embodied as any type of device for communicating with the land acquisition and property development analysis platform 12 and cloud-based server 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. In the embodiments described here, the computing device 17 is generally embodied as a PC. However, it should be noted that one or more devices 17 may include a smartphone or tablet, and the like.

As will be described in greater detail herein, the land acquisition and property development analysis platform 12 provides an interface with which a user may interact via an associated computing device, wherein the platform 12 provides land acquisition and/or property development analysis services. The platform 12 is deployed via a digital cloud, allowing for users to easily access the platform and obtain detailed analysis of land acquisition and/or property development opportunities in a given geographic area which can be filtered by country, region, city, and/or town. The platform 12 provides an interactive map with which a user may target a specific geographic area to identify land and/or property development/redevelopment opportunities within a desired area. In response to user input, which may include a text search or lasso-type search of a given area of interest, the platform provides a visual rendering of the area of interest, including a visual indication of sites (land and/or properties) located within the geographical area of interest, as well as various characteristics of any given site, including relevant land and/or property data and potential opportunities for site development (i.e., development new properties or redevelopment of existing properties), as will be described in greater detail herein.

It should be noted that embodiments of the system 10 of the present disclosure include computer systems, computer operated methods, computer products, systems including computer-readable memory, systems including a processor and a tangible, non-transitory memory configured to communicate with the processor, the tangible, non-transitory memory having stored instructions that, in response to execution by the processor, cause the system to perform steps in accordance with the disclosed principles, systems including non-transitory computer-readable storage medium configured to store instructions that when executed cause a processor to follow a process in accordance with the disclosed principles, etc.

Figure 2:
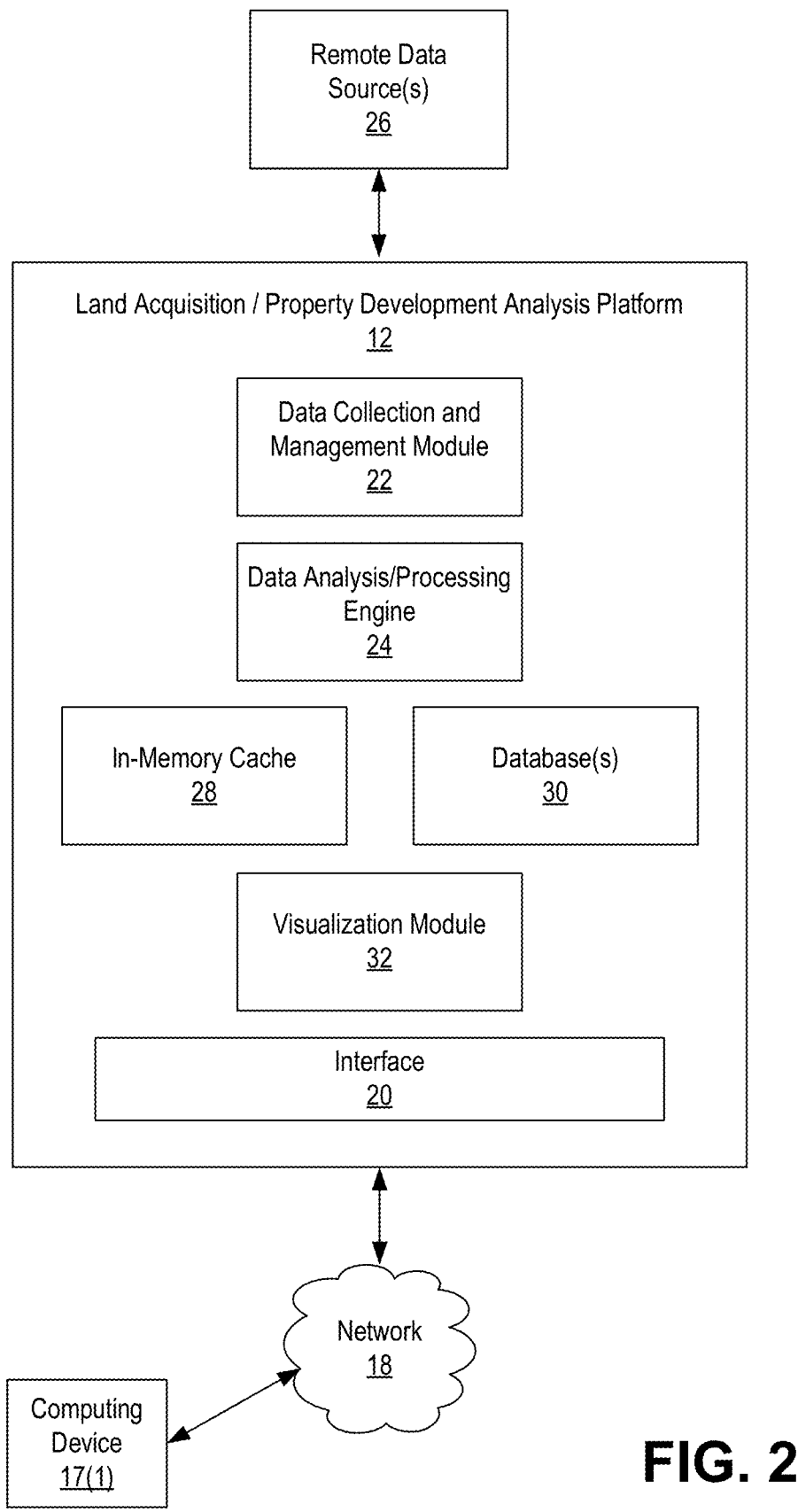
FIG. 2 is a block diagram illustrating the land acquisition and property development analysis platform of FIG. 1 in greater detail.

FIG. 2 is a block diagram illustrating the land acquisition and property development analysis platform 12 of FIG. 1 in greater detail. As shown, the land acquisition and property development analysis platform 12 includes an interface 20, a data collection and management module 22, a data analysis/processing engine 24, in-memory cache 28, and various databases 30 for storage of data, and a visualization module 32.

The interface 20 may generally allow a user (e.g., an authorized user) to access data on the land acquisition and property development analysis platform 12, via a software application, for example, provided on the computing device (i.e., via a mobile software application accessible via a mobile device) or via a web-based portal. For example, upon accessing a software application, the interface 20 may be presented to the user via their device 17, in which the user may navigate a dashboard or standard platform interface so as to view and interact with a map and further select from various tools/features to access data related to the map and geographical areas of interest, and subsequent sites determined to be within the geographical areas of interest, as will be described in greater detail herein. For example, upon registering or logging in, a user may begin a session in which they are presented with an interactive map and are able to target a specific geographical area in which they want to learn of land and/or property development/redevelopment opportunities. Upon selecting a geographical area of interest, the platform 12 provides a visual rendering, via the visualization module 32, of the area of interest, including a visual indication of sites (land and/or properties) located within the geographical area of interest, as well as various characteristics of any given site, including relevant land and/or property data.

The data collection and management module 22 is configured to receive session data (i.e., input from the user during a given session, including user selection data), at which point the data analysis/processing engine 24 is configured prepare data to be visually presented to the user (via the visualization module 32) by way of the interface of the platform. For example, in response to session data (including user selection input with the interface), the data analysis/processing engine 24 is configured read and analyze/process data sets from remote, third-party data sources 26 to score, mine, financially model, and provide 3D visualization of any proposed development site or scheme, essentially collating and providing relevant land and property data available in real, or near-real, time. The data analysis/processing engine 24 utilizes the in-memory cache 28 and databases 30 during processing/analyzing steps. In turn, the platform 12 is able to provide a user with a vast amount of land and property data for any given site in a geographical area of interest, and further provides unique scoring, categorization, impact analysis, and GDV calculations.

Figure 3:
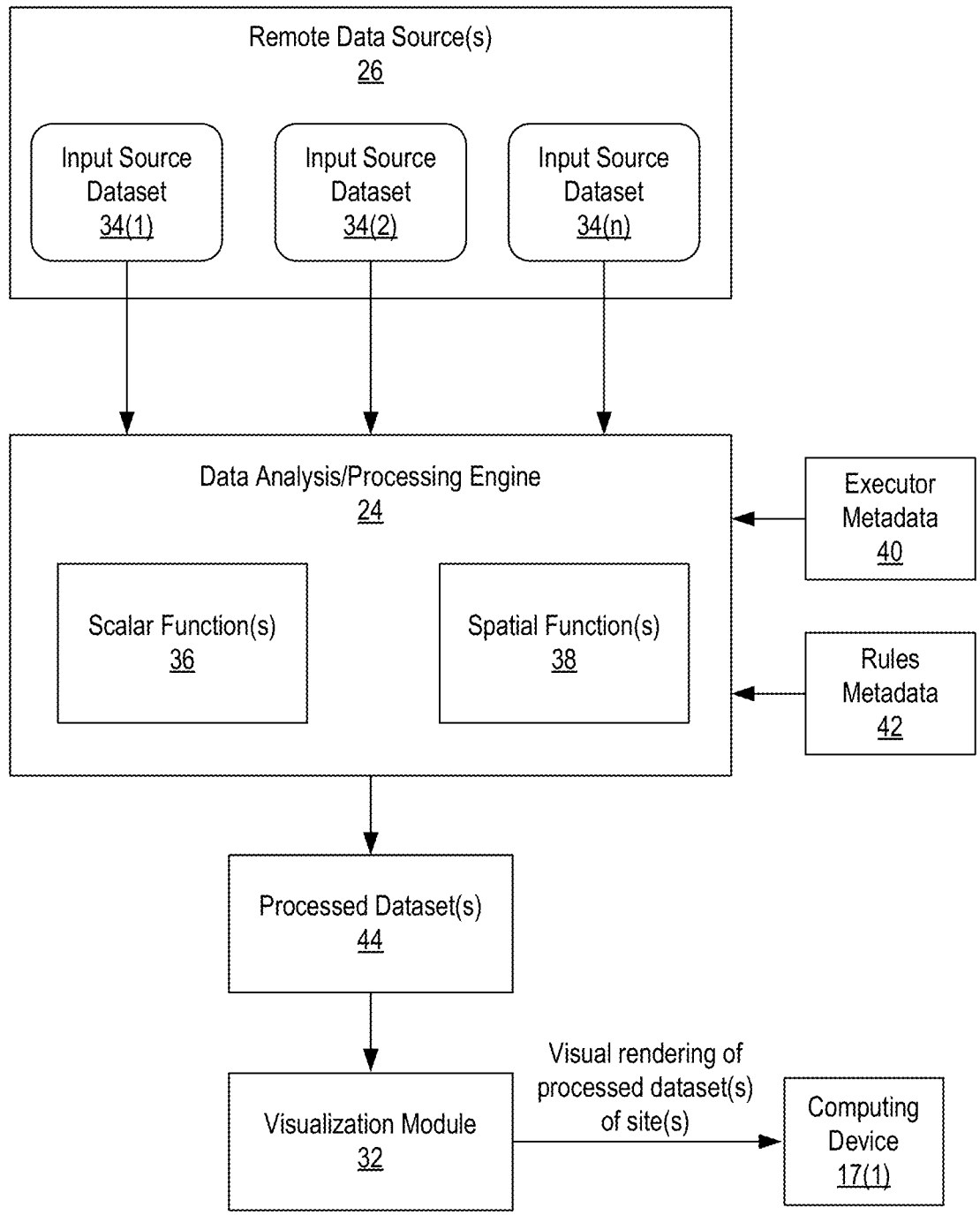
FIGS. 3 and 4 are block diagrams illustrating the functioning of the in-memory data analysis and processing engine in greater detail, including the reading and of datasets from remote third-party sources and generation of processed datasets based on analysis of the third-party source datasets via the in-memory data analysis and processing engine based on a set of data processing rules and set of scalar and spatial functions.
Figure 4:
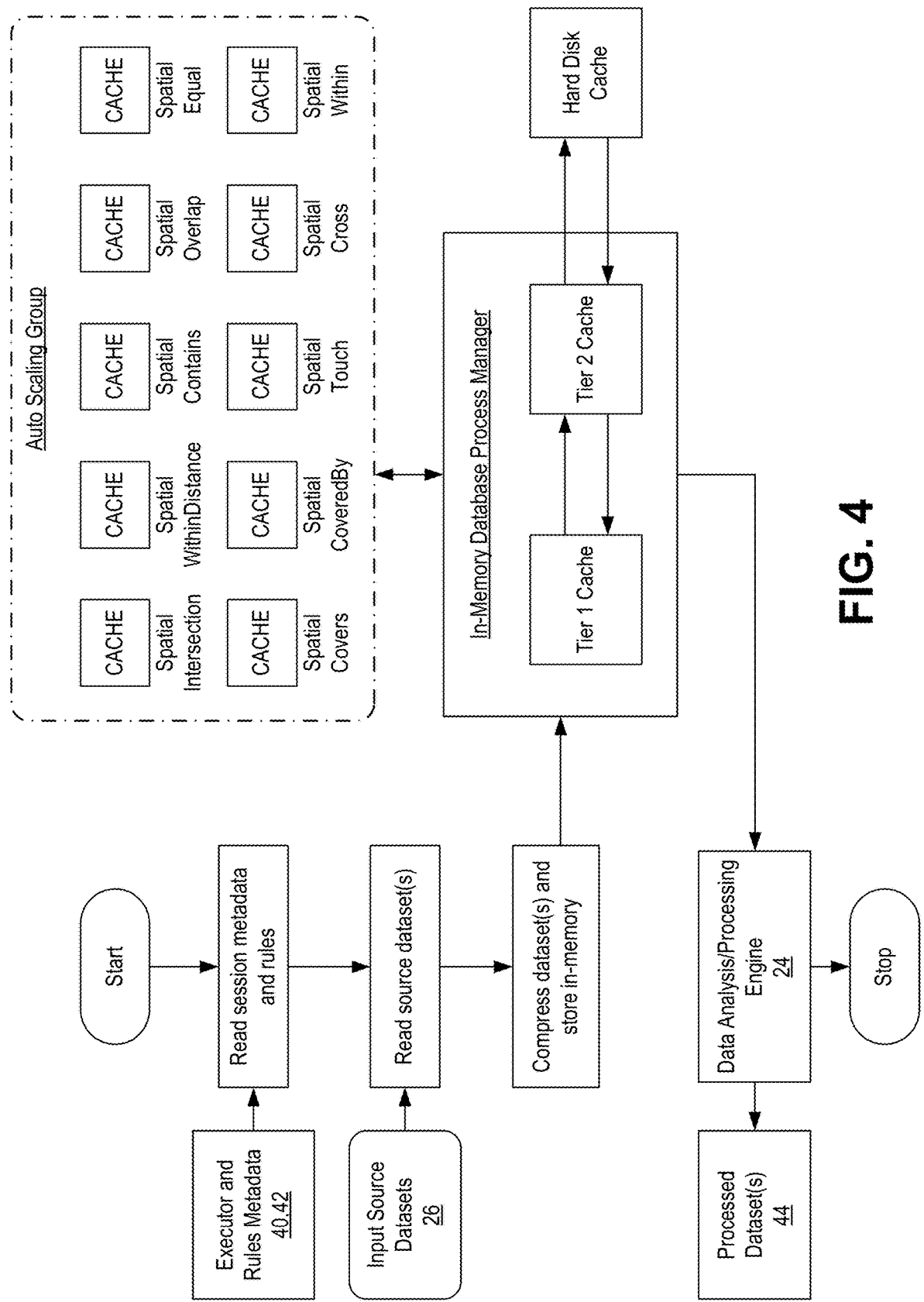

FIGS. 3 and 4 are block diagrams illustrating the functioning of the data analysis/processing engine 24 in greater detail. As will be described in greater detail herein, the engine 24 is configured to read and analyze/process input source datasets 34(1)-34(n) from remote third-party sources 26 based on the user selection of the geographical area of interest and further analyze/process the input source datasets 34(1)-34(n) to generate a plurality of processed datasets 44 based on a set of data processing rules and set of scalar functions 36 and spatial functions 38. In particular, the platform 12 is built upon a powerful in-memory object oriented processing engine 24 which is capable of reading input source datasets 34(1)-34(n) from various input sources 26 based on data processing rules, and executes them using a set of scalar and spatial functions 36, 38 to create a processed dataset 44. The remote third-party sources 26 may include publicly available or subscription-based data sources. For example, the input source datasets 34 may include, but are not limited to, zip code data, integrated transport network data, national public transport data, national amenities data, national energy performance data, sold house price data, national population data, drive time data, consumer insight and demographic data, competitors data, care home data, local business data, national landuse data, national topography data, national buildings data, national addressbase data, national roads data, national roadlinks data, land parcels data, national greenbelt data, environment data, and national terrain data. The third party data sources 26 or provides may include, for example, Land Registry, INSPIRE, OSGB, Office for National Statistics (ONS), Natural England, Local Authority Unit densities and others. Accordingly, each processed dataset 44 comprises information associated with a characteristic of land and/or properties of a given site located within the user-defined geographical area of interest.

The engine 24 operates by storing the most frequently used data in a compressed format in memory and the least frequently used data is pushed to hard disk. The core rules engine uses the data held in memory and data processing rules to generate a processed dataset, as shown in FIG. 4. For example, in an initial step, executor metadata 40 and rules metadata 42 is read, which are required to run the engine 24. Typical metadata would contain information about the connection details to various source datasets which would then be used by the engine 24 during the reading step. The engine 24 uses the rules which are loaded into memory in this step to determine how various source datasets 34 must be manipulated and generate processed datasets 44.

FIG. 5 is one embodiment of an exemplary set of executor metadata to be read by the in-memory analysis and processing engine 24 consistent with the present disclosure. The exemplary set of typical executor metadata illustrated contains information about connection details to various source datasets. FIG. 6 is one embodiment of an exemplary set of rules metadata to be read by the in-memory analysis and processing engine 24 consistent with the present disclosure.

Referring back to FIGS. 3 and 4, the engine 24 establishes connection to various source datasets 34 and reads all the data into a pre-defined data structure in memory. A cache in memory is created for various geometry functions, as illustrated in the Auto Scaling Group of caches in FIG. 4. A cache is a collection of in-memory engine objects and each object contains the attributes including, but not limited to, featureName (name of the source feature), objectId (unique identifier of the object), engineGeometry (spatial geometry of the object), and attributes (a map between source feature's scalar attributes and their values). The various geometry functions may include, but are not limited to, spatial intersection cache, spatial within distance cache, spatial contains cache, spatial overlap cache, spatial equal cache, spatial covers cache, spatial covered by cache, spatial touches cache, spatial crosses cache, and spatial within cache, for example. The source data is segregated and stored in one of these caches based upon their usage within the platform. For example, if the source datasets 34 contain four types of features; feature-a, feature-b, feature-c and feature-d, and, in the application, if feature-a, feature-b are used to perform spatial intersection functions and if feature-c, feature-d are used to perform spatial crosses functions, then the application writes feature-a, feature-b in spatial intersection cache, and, feature-c, feature-d are written to spatial crosses cache.

In a further step, the application compresses all the source data and stores them in memory. This will enable the application to store large number of objects in memory. The compression algorithm takes source feature and encodes it using google protocol buffer technology to generate byte array. The generated byte array is held in memory which is then used in next step to process the datasets. FIG. 7 is one embodiment of an exemplary compression dataset of an engine object processed by the in-memory analysis and processing engine 24 consistent with the present disclosure. FIG. 7 illustrates data structure of the engine object.

An instance of EngineObject may be initialized with the following values: featureName=Feature-A; objectId=1234; and geometry=POLYGON((0 0, 10 0, 10 10, 0 10, 0 0)). In turn, the compressed value of this engine object will resemble the below value (55 bytes in size):

10 9 70 101 97 116 117 114 101 45 65 16 −46 9 34 39 80 79 76 89 71 79 78 40 40 48 32 48 44 32 49 48 32 48 44 32 49 48 32 49 48 44 32 48 32 49 48 44 32 48 32 48 32 41 41

The above bytes will get stored in memory and will get de-serialized in to EngineObject instance when required.

The in-memory processing engine 24, in conjunction with in-memory database process manager and rules metadata, processes the source datasets 34 and generates output datasets 44 as shown in FIG. 4. The in-memory database process manager is responsible for storing the objects in appropriate tiers of cache. For example, Tier-1-Cache may be used to store frequently used objects, including objects which are used in the last 60 seconds, while Tier-2-Cache may be used to store objects which are used in the last 300 seconds, and Hard Disk Cache may be used to store objects whose last access time is greater than 300 seconds.

Figure 8:
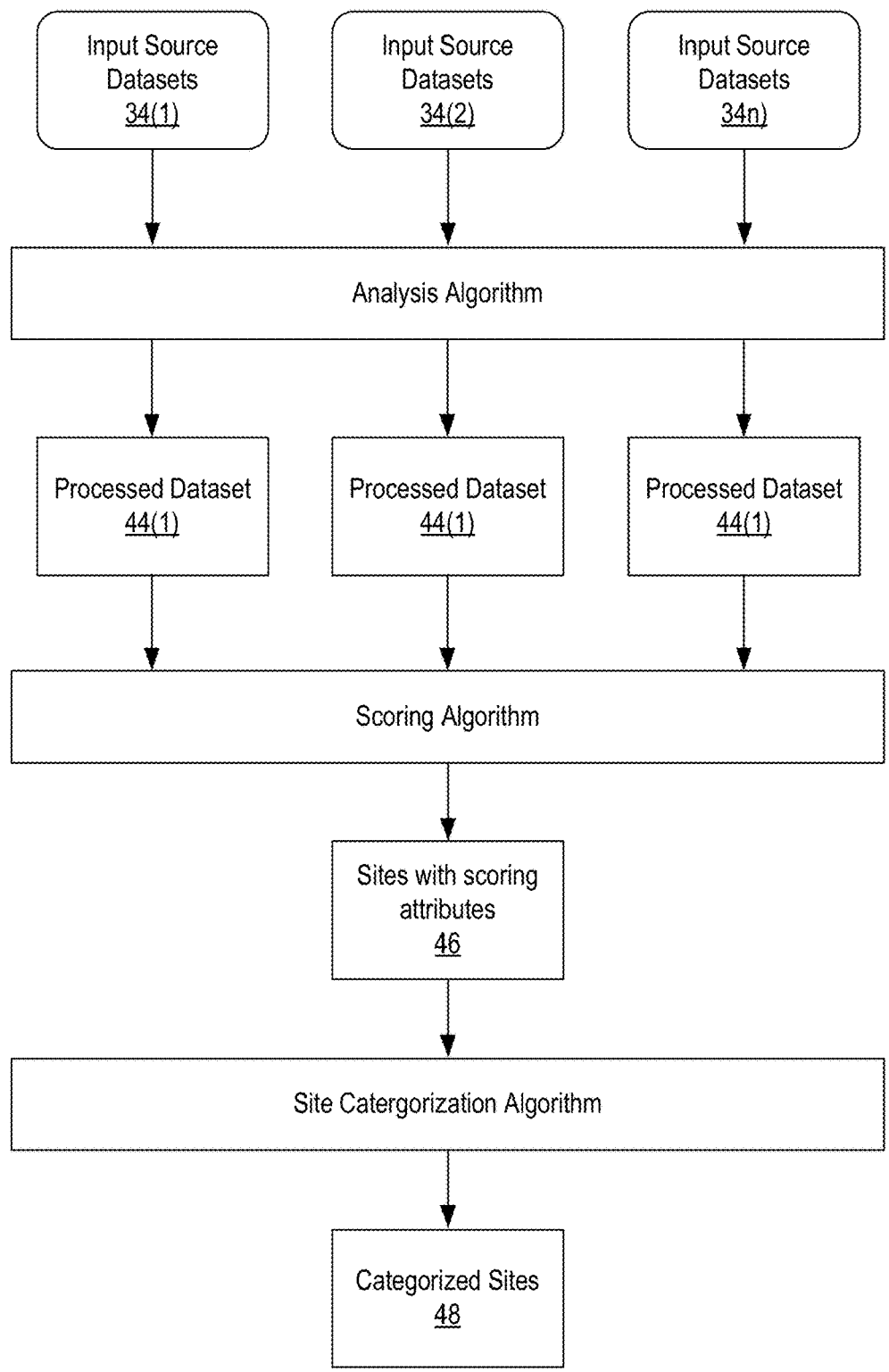
FIG. 8 is a block diagram illustrating data preparation, analysis, scoring, and categorization as carried out by the in-memory analysis and processing engine consistent with the present disclosure.

FIG. 8 is a block diagram illustrating data preparation, analysis, scoring, and categorization as carried out by the in-memory analysis and processing engine 24 consistent with the present disclosure. As previously described, the processing engine 24 is configured to read one or more input source datasets 34(1)-34(n) from remote third party sources 26 based on the user selection of the geographical area of interest and further analyze the one or more input source datasets 34(1)-34(n) based, at least in part, on a set of data processing rules and set of scalar and spatial functions to generate the plurality of processed datasets 44(1)-44(n). Each processed dataset 44(1)-44(n) is associated with a corresponding analysis performed via the processing engine 24 for a given site located within the geographical area of interest and comprises information associated with a characteristic of land and/or property of a given site. For example, the analysis may include, but is not limited to, proximity amenities analysis, house prices analysis, demographic and industrial analysis, buildings analysis, road frontage analysis, site creation analysis, environmental analysis, slope analysis, and land use analysis.

For example, the analysis and processing engine 24 may include custom, proprietary, known and/or after-developed statistical analysis code (or instruction sets), hardware, and/or firmware that are generally well-defined and operable to receive two or more sets of data and identify, at least to a certain extent, a level of correlation and thereby associate the sets of data with one another based on the level of correlation. As such, the analysis and processing engine 24 may analyze various input source datasets 34 relative to one another and in accordance with an analysis algorithm to thereby determine a characteristic of land and/or property of a given site.

FIGS. 9A-9I are block diagrams illustrating various analyses carried out by the in-memory analysis and processing engine for a given site for the generation of processed datasets.

Figure 9A:
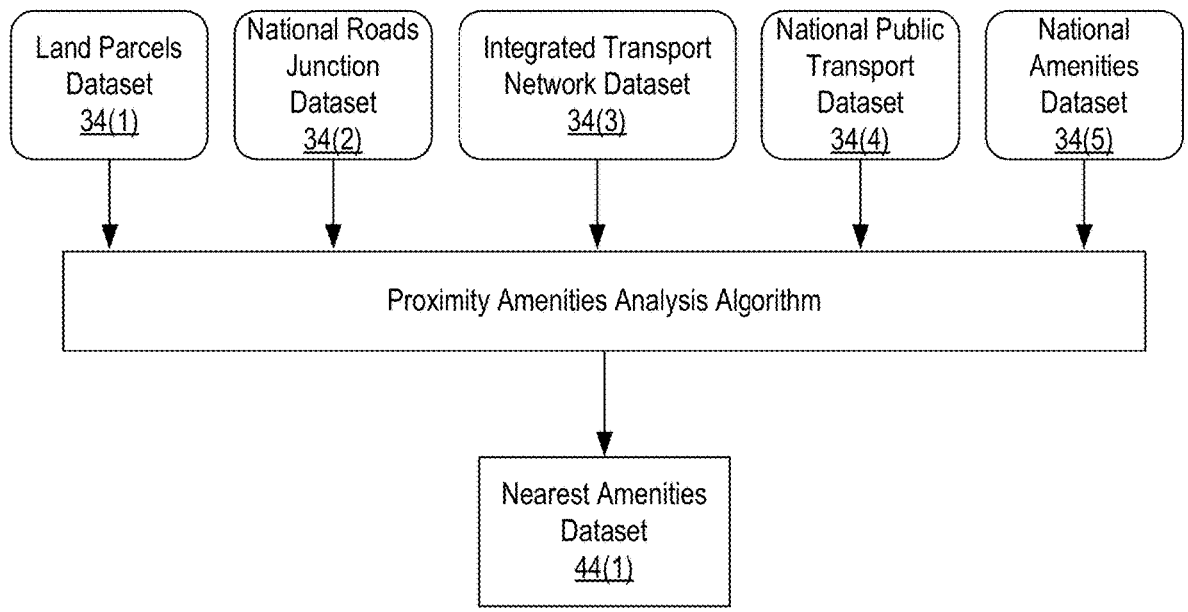
FIGS. 9A-9I are block diagrams illustrating various analyses carried out by the in-memory analysis and processing engine for a given site for the generation of processed datasets.

FIG. 9A is a block diagram illustrating proximity amenities analysis. This algorithm will analyze nearby amenities such as train stations, bus stops, chemists, dentists, doctors, schools and retail outlets, and calculate the distance to each. The input source datasets include a land parcels dataset 34(1), a national road junctions dataset 34(2), an integrated transport network dataset 34(3), a national public transport dataset 34(4), and a national amenities dataset 34(5). Upon processing the input source datasets 34(1)-34(5) via a proximity amenities analysis algorithm, the engine 24 generates a nearest amenities dataset 44(1). The generated nearest amenities dataset may include attributes including, but not limited to the nearest bus stop, distance and drive time from a land parcel, the nearest train station, distance and drive time from a land parcel, the nearest chemist facility, distance and drive time from a land parcel, the nearest dentist facility, distance and drive time from a land parcel, the nearest doctor facility, distance and drive time from a land parcel, the nearest retail outlet facility, distance and drive time from a land parcel, the nearest school, distance and drive time from a land parcel, and the nearest road junction, distance and drive time from a land parcel.

Figure 9B:
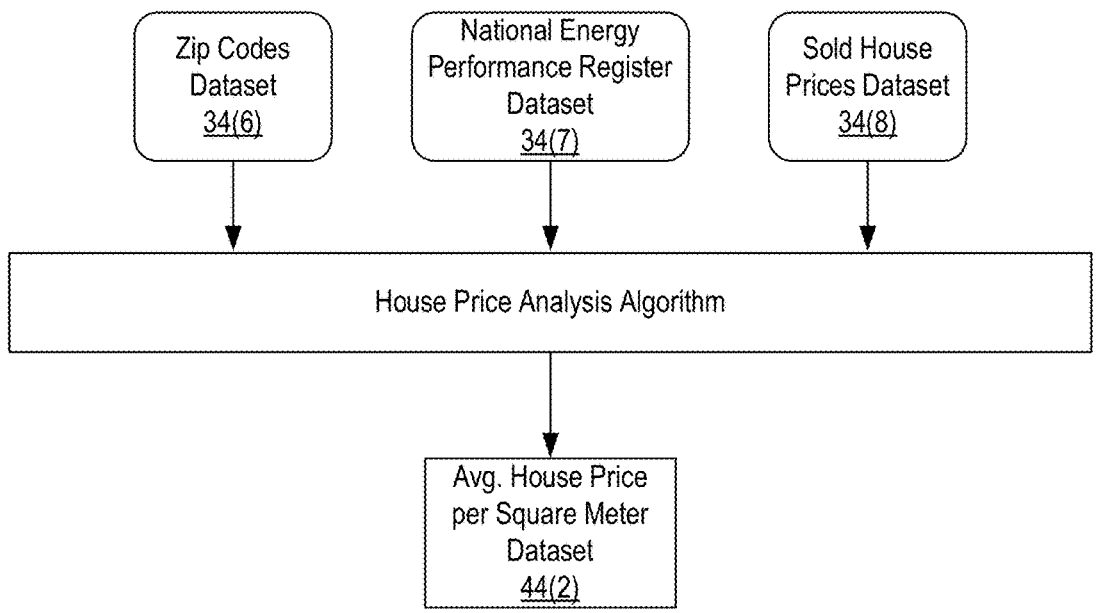

FIG. 9B is a block diagram illustrating house prices analysis. This algorithm uniquely determines the price per square meter of each zip code by collating sold house prices and national energy performance register datasets, which are then used to determine site profitability. The input source datasets include the zip codes dataset 34(6), a national energy performance register dataset 34(7), and a sold house prices dataset 34(8). Upon processing the input source datasets 34(6)-34(8) via a house price analysis algorithm, the engine 24 generates an average house price per square meter dataset 44(2). The generated dataset may include attributes including, but not limited to, average price paid data for residential houses (apartments, terraced, semi-detached and detached) and commercial properties, and the average price per square meter for residential houses and commercial properties.

Figure 9C:
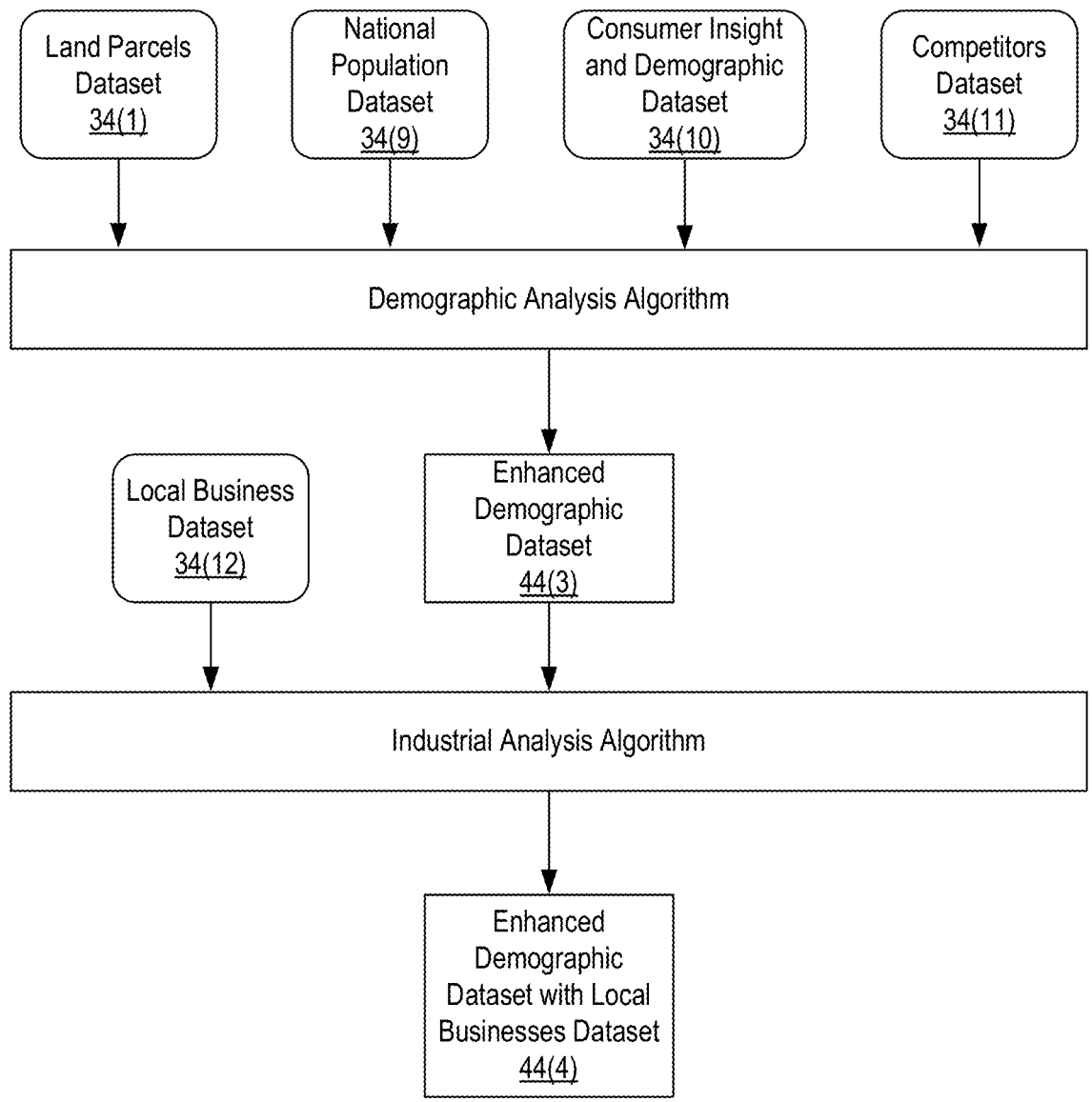

FIG. 9C is a block diagram illustrating demographic and industrial analysis. This algorithm provides analysis of demographic information for a specific location or region, uniquely predicting residential and commercial property demand for a specific location. The algorithm uniquely calculates the population and number of households within 3 miles radius and 1 mile radius from a site, for example. However, it should be noted that the radius may be different and it not limited to a 3 mile and/or 1 mile radius, respectively. This algorithm also provides unique analysis of industrial and commercial information, predicting industrial commercial property demand for a specific location or region over set distances and identifying optimal sites. The input source datasets include the land parcels dataset 34(1), a national population dataset 34(9), a consumer insight and demographic dataset 34(10), and a competitors dataset 34(11). Upon processing the input source datasets 34(1) and 34(9)-34(11) via a demographic analysis algorithm, the engine 24 generates an enhanced demographic dataset 44(3). The enhanced demographic dataset 44(3) is further processed with an additional input source dataset, a local business dataset 34(12) via an industrial analysis algorithm, and, in turn, the engine 24 generates an enhanced demographic dataset with local businesses dataset 44(4). The generated demographic datasets 44(3) and 44(4) may include attributes including, but not limited to, the number of households living in condominium, apartments, houses and luxury houses, the number of households living in social housing, the number of households living in student accommodation, the number of households living in care homes, the national average price ratio for condominium, apartments, terraced, semi-detached and detached houses within 3 miles and 1 mile radius, the number of households living within 3 miles and 1 mile radius from various commercial areas like supermarkets, hotels, leisure centers, restaurants/pubs, kindergartens, retail shops, distribution depots, light industrial centers, warehouses, car showrooms and car wash centers, and the number of competitors within 3 miles and 1 mile radius for car show rooms, doctors, leisure centers, hotels and kindergartens.

Figure 9D:
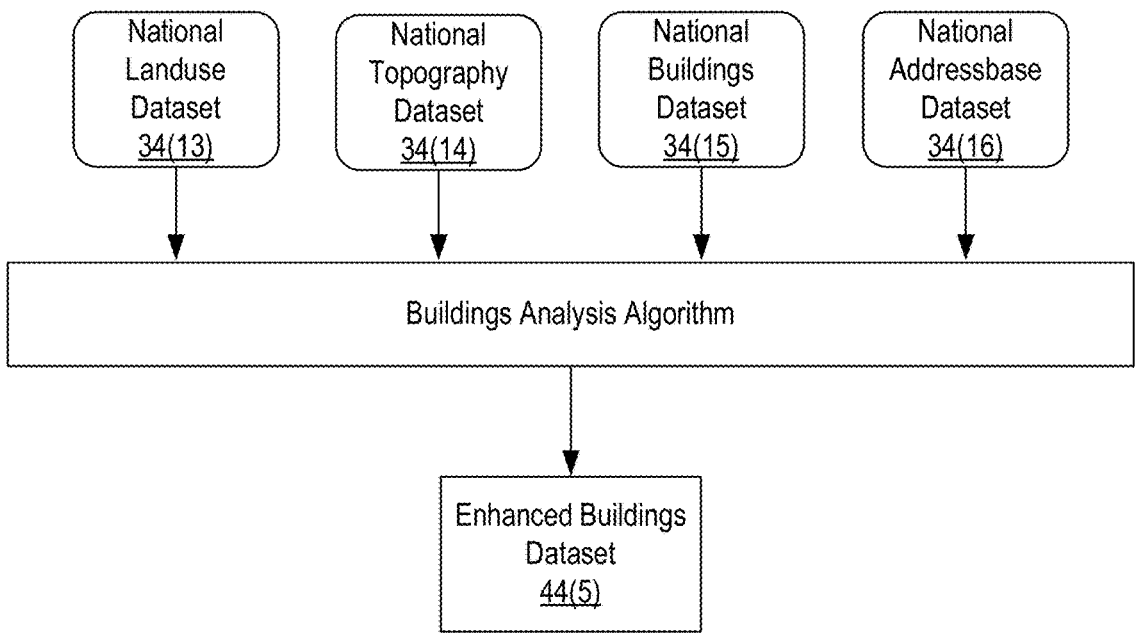

FIG. 9D is a block diagram illustrating buildings analysis. This algorithm uniquely analyses all buildings in a specific country, region, city, municipality, or the like to determine the maximum height any given site could be redeveloped, such as, for example, the UK. The input source datasets include a national landuse dataset 34(13), a national topography dataset 34(14), a national buildings dataset 34(15), and a national addressbase dataset 34(16). Upon processing the input source datasets 34(13)-34(16) via a building analysis algorithm, the engine 24 generates an enhanced buildings dataset 44(5). This generated dataset 44(5) may include attributes including, but not limited to, building description like residential, hotel, industrial, commercial, the maximum building height allowed, the building roof type, the maximum stories allowed, and the building price per square foot.

Figure 9E:
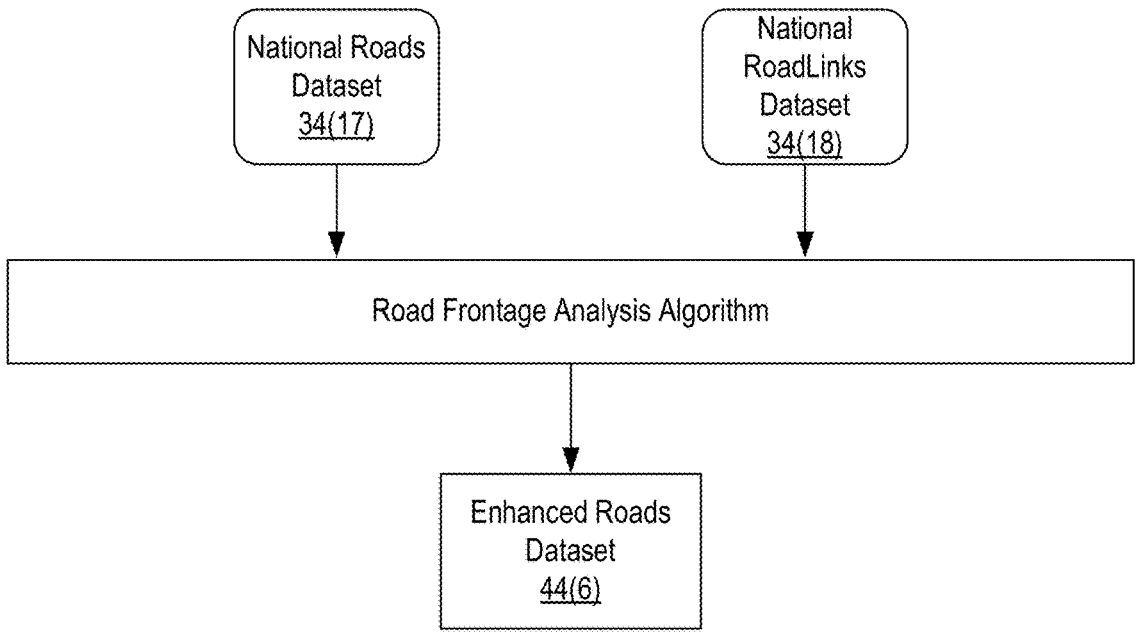

FIG. 9E is a block diagram illustrating road frontage analysis. This algorithm analyses different types of roads in a specific country, region, city, municipality, or the like, identifies the sites with best road frontages for different purposes, such as road frontage in the UK—Motorways, A and B Roads, etc. The input source datasets include a national roads dataset 34(17) and a national roadlinks dataset 34(18). Upon processing the input source datasets 34(17)-34(18) via a road frontage analysis algorithm, the engine 24 generates an enhanced roads dataset 44(6). The generated dataset 44(6) enhances the road dataset by including attributes including, but not limited to, the road description like Motorway, A Road, B Road, Restricted Access, a buffered geometry based on road description, and the road nature.

Figure 9F:
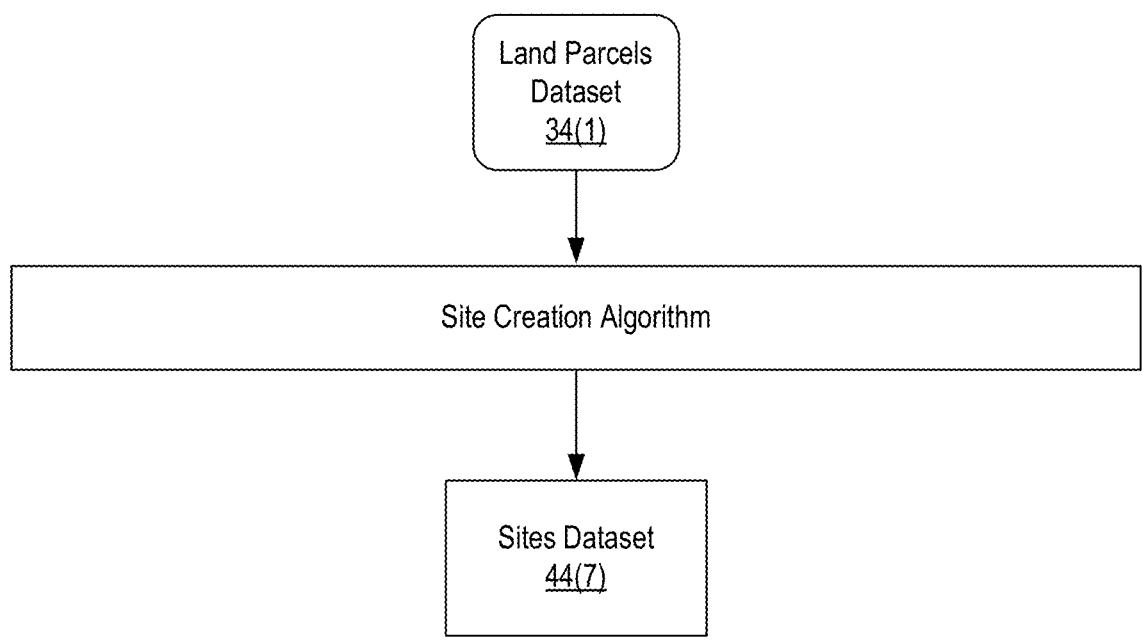

FIG. 9F is a block diagram illustrating site creation analysis. This algorithm takes Land Parcels in a given country, region, city, municipality, or the like, as an input and generates sites. This algorithm uniquely determines the adjacent sites which can be merged together and creates these bigger and combined sites. The input source datasets include a Land Parcels dataset 34(1). Upon processing the input source dataset 34(1) via a site creation algorithm, the engine 24 generates a sites dataset 44(7).

Figure 9G:
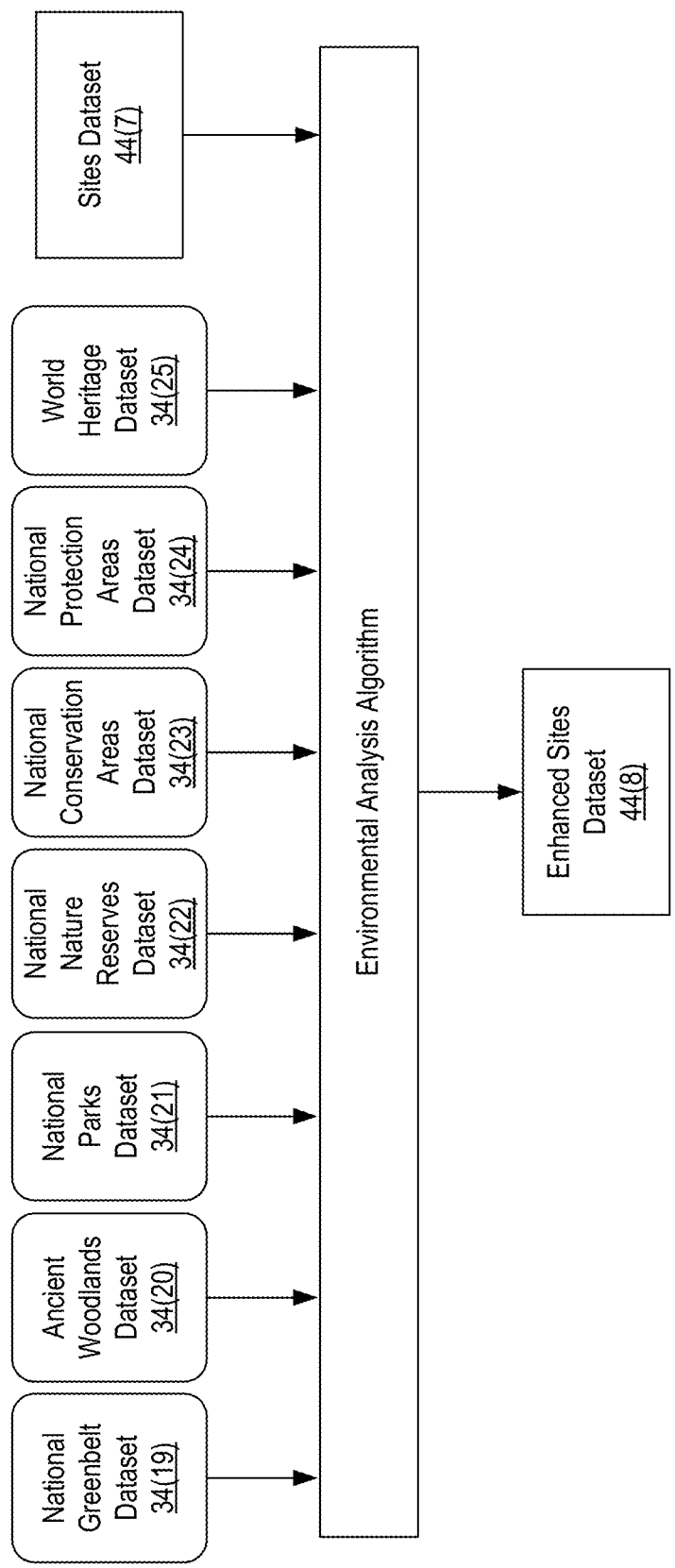

FIG. 9G is a block diagram illustrating environmental analysis. This algorithm analyses various environmental datasets in a given country, region, city, municipality, or the like (e.g., the UK including, for example, Natural England and Historic England) and identifies sites not located in these national heritage locations. The algorithm analyses contaminated land to ensure this is also accounted for in any GDV and ranking calculations. The input source datasets include a national greenbelt dataset 34(19), ancient woodlands dataset 34(20), national parks dataset 34(21), national nature reserves dataset 34(22), national conservation areas dataset 34(23), national protection areas dataset 34(24), world heritage sites 34(25), in addition to the sites dataset 44(7). Upon processing the input source datasets 34(19)-34(25) with the sites dataset 44(7) via the environmental analysis algorithm, the engine 24 generates an enhanced sites dataset 44(8). The generated enhanced sites dataset 44(8) enhances the sites dataset 44(7) by including attributes including, but not limited to, special protection area name, special areas of conservation name, scientific interest area name, wetland site name designated of international importance, national park name, country park name, national natural reserve area name, local natural reserve area name, any other natural beauty area name, natural area name, ancient woodlands area name, world heritage site area name, and green belt area name, for example.

Figure 9H:
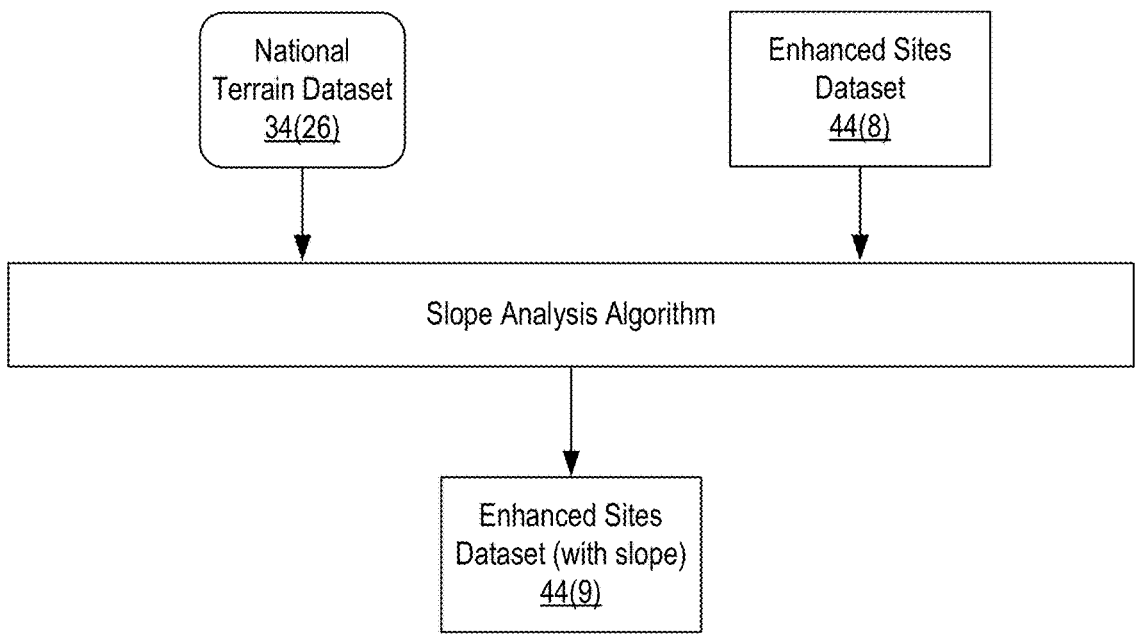

FIG. 9H is a block diagram illustrating slope analysis. This algorithm uniquely calculates the slope of all sites. The input data sources include a national terrain dataset 34(26) and the enhanced sites dataset 44(8). Upon processing the input source datasets 34(26) and enhanced sites dataset 44(8) via the slope analysis algorithm, the engine 24 generates an enhanced sites dataset (with slope) 44(9). The generated enhanced sites dataset (with slope) 44(9) further includes attributes including, but not limited to, minimum slope, maximum slope, and average slope.

Figure 9I:
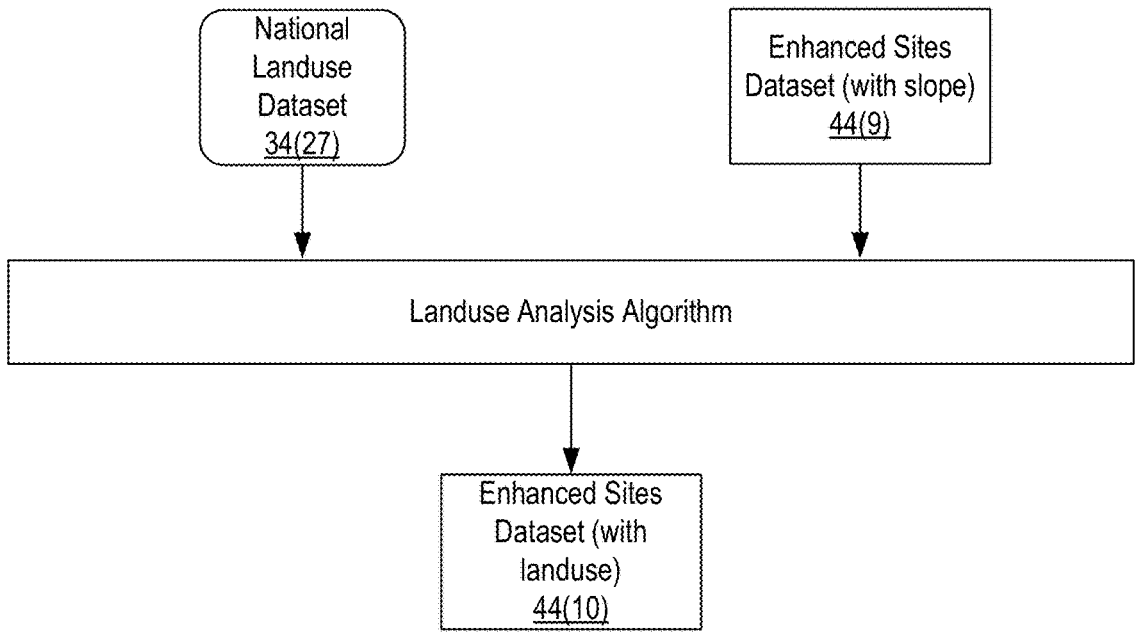

FIG. 9I is a block diagram illustrating land use analysis. This algorithm analyses various datasets to determine if the site is in a high-density, medium density or low-density residential area. This algorithm also determines if the site is located in green belt, agricultural land, woodlands, vineyards or farms. The input source datasets include a national landuse dataset 34(27) and the enhanced sites dataset (with slope) 44(9). Upon processing the input source datasets 34(27) and enhanced sites dataset (with slope) 44(9) via the landuse analysis algorithm, the engine 24 generates an enhanced sites dataset (with landuse) 44(10). The generated enhanced sites dataset (with landuse) 44(10) enhances the sites dataset by adding attributes including, but not limited to, whether the site is in a high density or medium density or low density residential areas, whether the site is in a urban center, whether the site is in a commercial or industrial areas, and whether the site is in an agricultural area.

Figure 10:
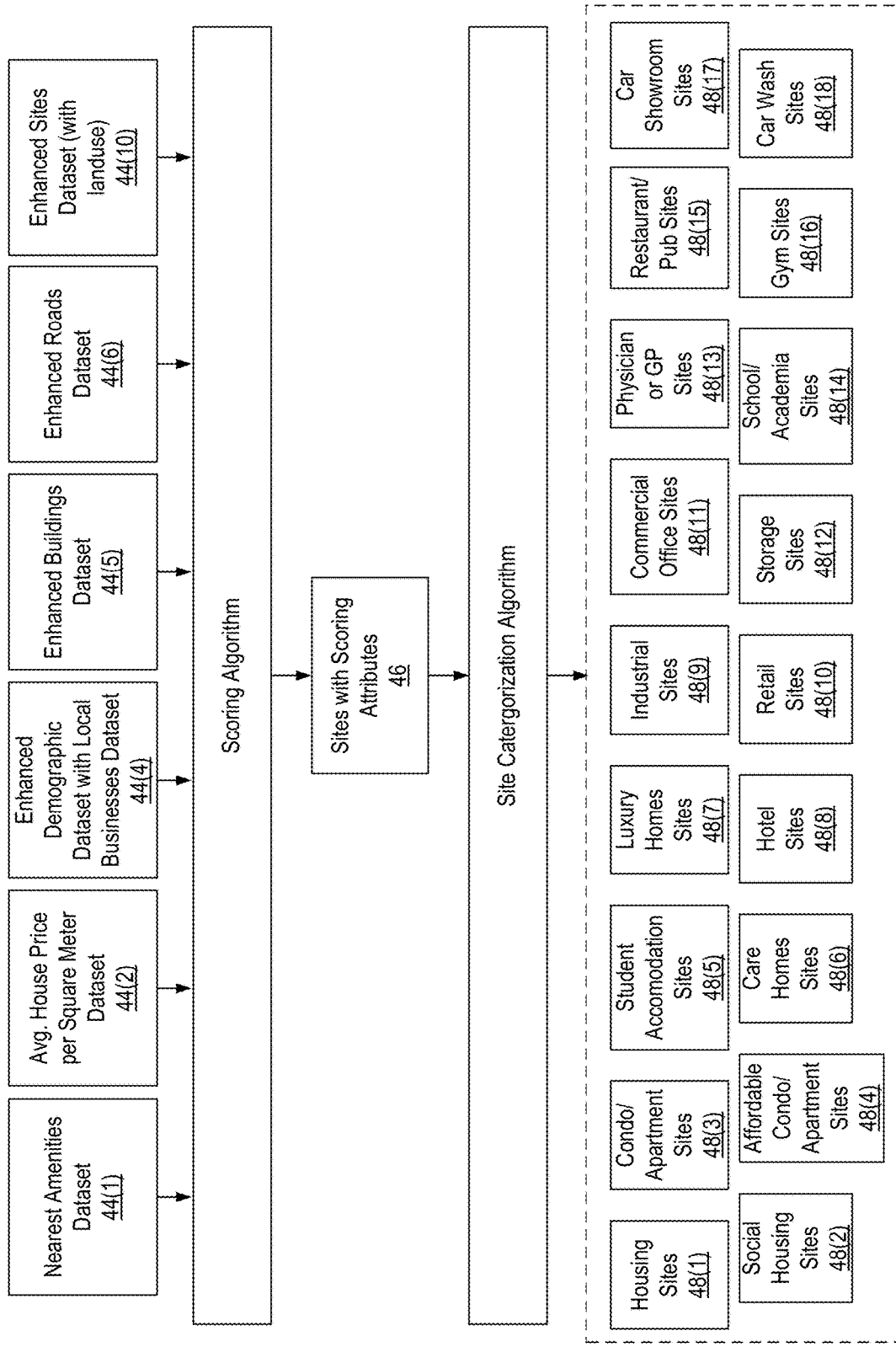
FIG. 10 is a block diagram illustrating scoring and categorization functions carried out by the in-memory analysis and processing engine for a given site for the generation of scoring attributes and categorizing for a given site.

In addition to site attributes and site-specific information, the platform 12 further provides scoring and categorization functionality. FIG. 10 is a block diagram illustrating scoring and categorization functions carried out by the in-memory analysis and processing engine 24 for a given site for the generation of scoring attributes and categorizing for a given site (e.g., sites with scoring attributes 46). In particular, the engine 24 analyzes the land and/or property data obtained from third party data sources and, based on unique artificial intelligence scoring algorithms, ranks and identifies, by development type, the most viable and highest yielding sites available in any given geographic area. For example, a single site may be analyzed and scoring attributes will be added for each site, the scoring attributes including, but not limited to, developed area score, environmental score, flood zone score, listed buildings score, strategic area score, shape score, commercial competitor's score, commercial customer's score, house prices score, land use score, proximity amenities score, revenue per acre score, road frontages score, and site size score.

Based on the above scores, the engine 24 further processes the sites with scoring attributes 36 via a categorization algorithm to thereby categorize each site into a defined category of land or property type based on analysis of at least one or more scoring attributes. The categories may include, but are not limited to, housing sites 48(1), social housing sites 48(2), condominium/apartments sites 48(3), affordable condominium/apartments sites 48(4), student accommodation sites 48(5), care homes sites 48(6), luxury homes sites 48(7), hotel sites 48(8), industrial sites 48(9), retail sites 48(10), commercial offices sites 48(11), storage sites 48(12), physician or general practitioner sites 48(13), school or academia sites 48(14), restaurants/pubs sites 48(15), gym sites 48(16), car showroom sites 48(17), and car wash sites 48(18).

Each of the categories are scored on various criteria, including, but not limited to, the size of the site, the percentage of the site which is already developed, the number of existing properties on the site, the best road frontage available for the site, the land use of the site, the population and households within 3 miles and 1 mile radius from the site, average house prices within 3 miles and 1 mile radius from the site, the listed building status of the site, the flood risk for the site, the proximity distances to various amenities like bus stop, train stations, chemists and retail, hospitals, doctors, schools, colleges, universities from the site, the potential revenue per acre of the site, future development opportunities of the site, the environmental factors on the site; such as whether it is situated in a Special Protection Area, Country Park, Ancient Woods, World Heritage Site or Greenbelt, and planning permission and local and national policy analysis.

Furthermore, upon the execution of a query from a user, the platform 12 is able to calculate and provide the Gross Development Value (GDV) (i.e., a calculation of what a development property should be worth on the open market) for a given site or combination of sites. In particular, the engine 24 is configured to generate the GDV calculation based, at least in part, on an analysis of one or more processed datasets, scoring attributes, and categorizations performed via the processing engine for a given site. To deliver this functionality, the engine 24 may analyze market values (past and present) and, in the case of existing buildings, energy performance. For example, in the UK, the platform 12 would utilize Land Registry Price Paid Data and the Energy Performance Certificate Register, and calculates the price per square meter by Zip code. The engine 24 would then analyze various available development templates and applies the template, yielding the highest score and potential profit. Accordingly, a typical residential development template, for example, would calculate basis various parameters including, but not limited to, the percentage of area allocated for social housing, the percentage of area allocated for condominium, apartments, terraced, semi-detached and detached houses, the sales price and cost price per square meter of a single unit. A typical commercial office development would collate factors including, but not limited to, workspace area per employee, the percentage of area allocated for workplace support, retail and leisure, and sales price and cost price per square meter.

Figure 11:
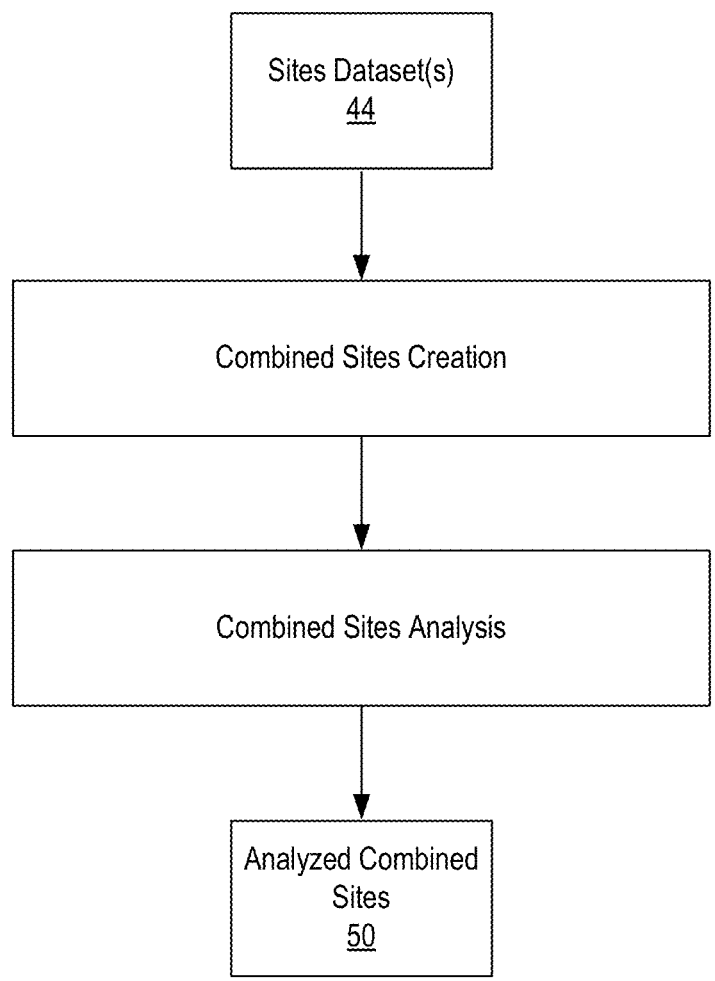
FIG. 11 is a block diagram illustrating combined sites analysis carried out by the in-memory analysis and processing engine to uniquely identify potential combinations of neighboring sites.

The platform 12 is further configured to provide combined site creation and analysis. FIG. 11 is a block diagram illustrating combined sites analysis carried out by the in-memory analysis and processing engine 24 to uniquely identify potential combinations of neighboring sites. In particular, the engine 24 utilizes this algorithm to uniquely identify any neighboring sites which could be combined with a given site, thereby creating larger and more viable combined sites 50, potentially yielding a significantly higher return (GDV).

Figure 12:
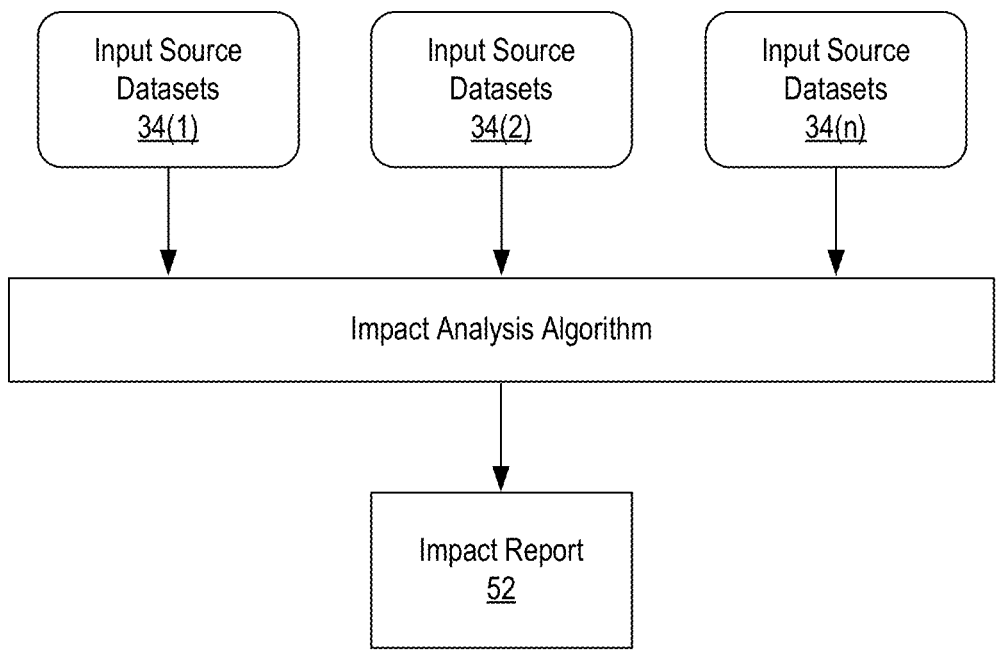
FIG. 12 is a block diagram illustrating impact analysis and reporting carried out by the in-memory analysis and processing engine to provide impact analysis reports concerning various factors when a site is either developed or redeveloped (based on proposals).

The platform 12 is further enabled to provide impact analysis reports concerning various factors when a site is either developed or redeveloped (based on proposals), thereby providing an indication of the impact that a proposed developments have on such factors. FIG. 12 is a block diagram illustrating impact analysis and reporting carried out by the in-memory analysis and processing engine 24, in which input source dataset(s) are analyzed and processed, via an impact analysis algorithm, in which the engine 24 generates an impact analysis report 52. The impacted factors may include, for example, road traffic on an existing road network, school capacity, health services capacity, emergency services response time, utility network demand and connection, as well as carbon footprint.

FIGS. 13A, 13B, 13C, 13D, 13E, and 13F are block diagrams illustrating various impact analysis and reporting functions corresponding to road networks, schools, health services, emergency services, utility networks, and land parcels, respectively.

Figure 13A:
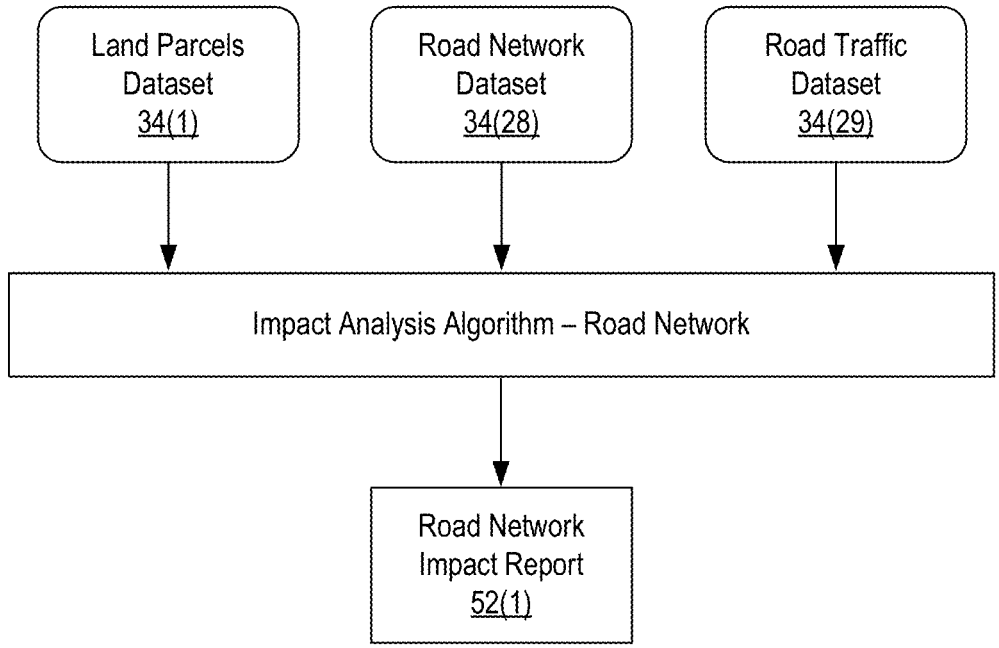
FIGS. 13A, 13B, 13C, 13D, 13E, and 13F are block diagrams illustrating various impact analysis and reporting functions corresponding to road networks, schools, health services, emergency services, utility networks, and land parcels, respectively.

FIG. 13A is a block diagram illustrating road network impact analysis and reporting. This analysis will be carried out to determine if the existing road network within 10 minute drive time from the land parcel will be able to sustain the increase in traffic due to the proposed development. However, it should be noted that other time frames may be used and may be more or less than 10 minutes. The input source datasets include a land parcels dataset 34(1), a road network dataset 34(28), and a road traffic dataset 34(29). Upon processing the input source datasets 34(1), 34(28), and 34(29) via a road network impact analysis algorithm, the engine 24 generates a road network impact report 52(1). The generated road network impact report 52(1) may include, for example, existing traffic data at peak periods (e.g. Monday to Friday from 7:00 am to 10:00 am and from 4:00 pm to 7:00 pm) and estimated increase in traffic data due to the proposed development.

Figure 13B:
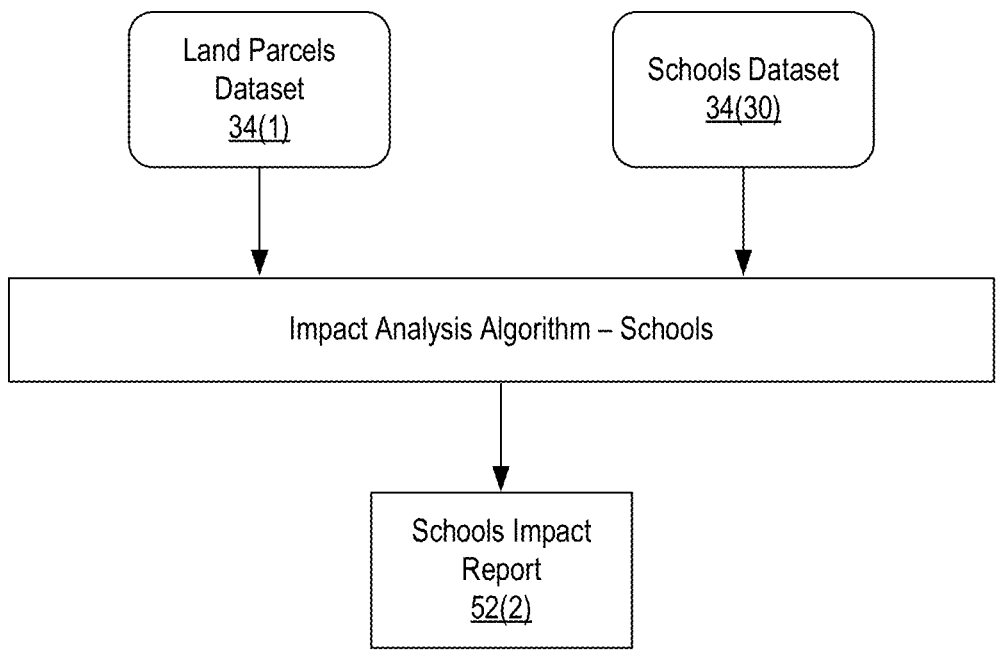

FIG. 13B is a block diagram illustrating schools impact analysis and reporting. This analysis will be carried out if the schools nearby to the land parcel have sufficient capacity to accommodate the children from the proposed development. The input source datasets include the land parcels dataset 34(1) and a schools dataset 34(30). Upon processing the input source datasets 34(1) and 34(30) via a schools impact analysis algorithm, the engine 24 generates a schools impact report 52(2). The generated schools impact report 52(2) may include, for example, existing capacity of nearby schools and estimated increase in demand for school places due to the proposed development.

Figure 13C:
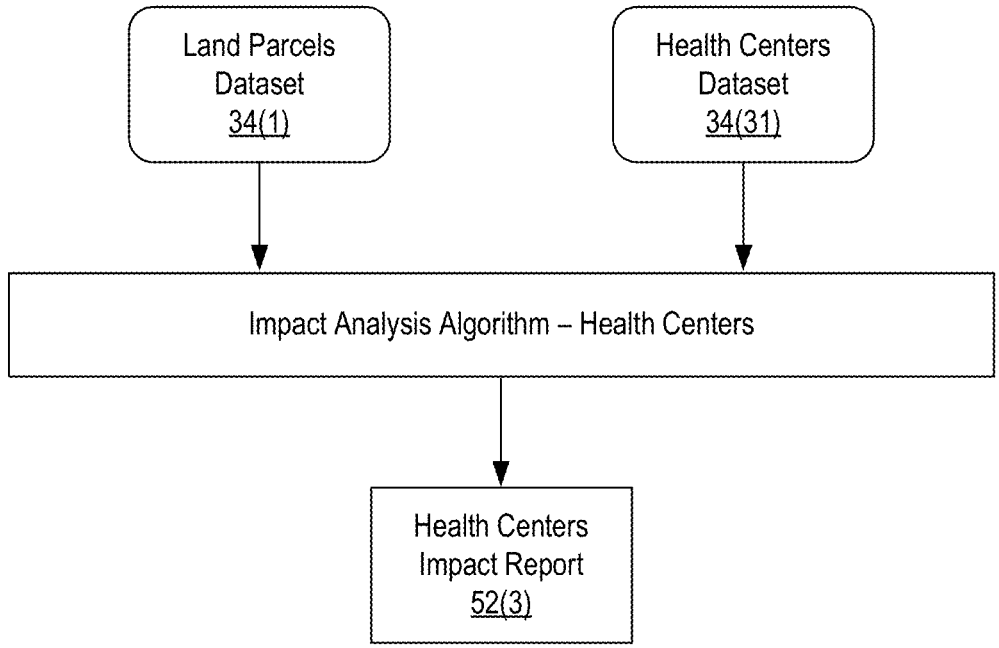

FIG. 13C is a block diagram illustrating health services impact analysis and reporting. This analysis will be carried out if the nearby health services have the capacity to accommodate the demand from the proposed development. The input source datasets include the land parcels dataset 34(1) and a health centers dataset 34(31). Upon processing the input source datasets 34(1) and 34(31) via a health centers impact analysis algorithm, the engine 24 generates a health centers impact report 52(3). The generated health centers impact report 52(3) may include data, for example, the total number of existing health centers and total number of doctors available in each health center, the number of registered patients at each health center, and estimated increase in demand due to proposed health center.

Figure 13D:
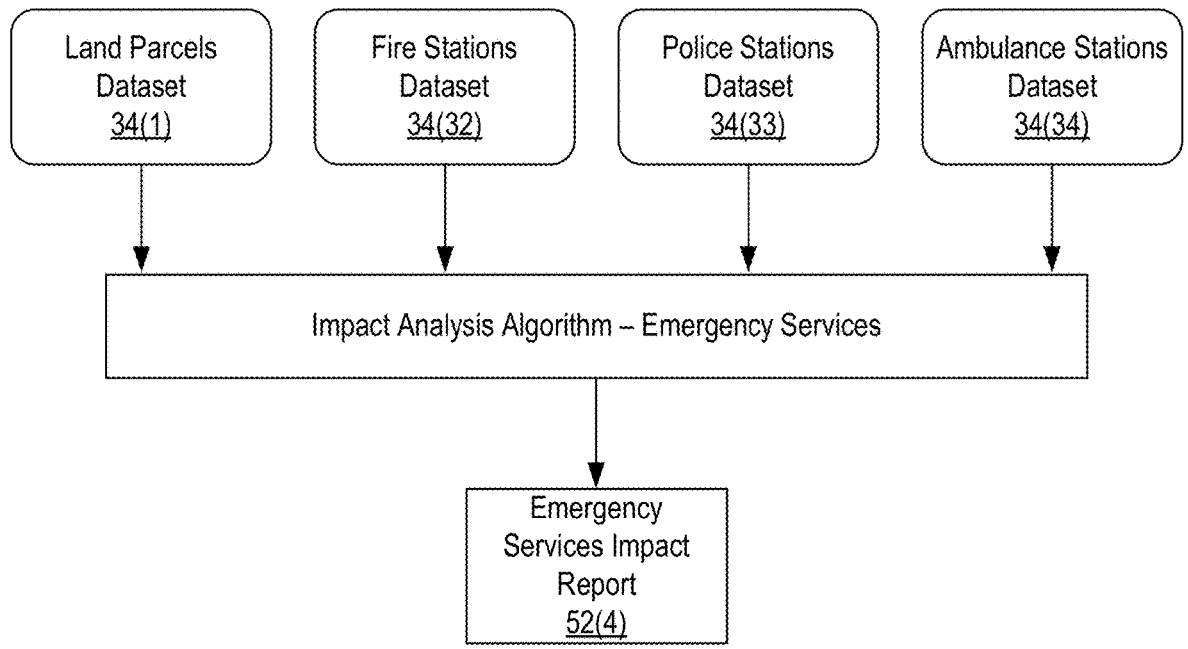

FIG. 13D is a block diagram illustrating emergency services impact analysis and reporting. This analysis will be carried out if the emergency services such as Fire, Police and Ambulance can respond to in the event of an emergency within national average response time for those services. The input source datasets include the land parcels dataset 34(1), a fire stations dataset 34(32), a police stations dataset 34(33), and an ambulance stations dataset 34(34). Upon processing the input source datasets 34(1) and 34(32)-34(34) via an emergency services impact analysis algorithm, the engine 24 generates an emergency services impact report 52(4). The generated emergency services impact report 52(4) may include, for example, the national average response times of fire, police and ambulance services, the distance to nearest fire station, the distance to nearest police station, and the distance to nearest ambulance station.

Figure 13E:
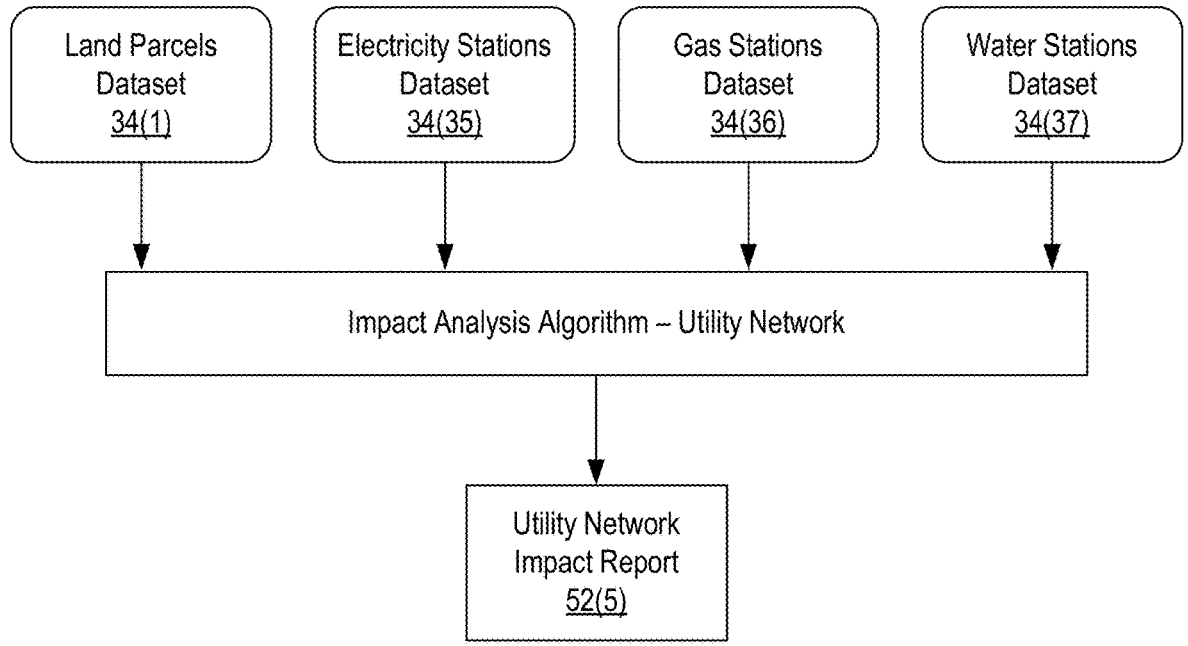

FIG. 13E is a block diagram illustrating utility networks impact analysis and reporting. The analysis will be carried out to estimate the costs involved in order to connect the buildings in the proposed development to the nearest main station or substation of utility networks, such as Gas, Electricity and Water. The input source datasets include the land parcels dataset 34(1), an electricity stations dataset 34(35), a gas stations dataset 34(36), and a water stations dataset 34(37). Upon processing the input source datasets 34(1) and 34(35)-34(37) via a utility network impact analysis algorithm, the engine 24 generates a utility network impact report 52(5). The generated utility network impact report 52(5) may include, for example, the cost involved in connecting proposed development buildings to the nearest electricity station, the cost involved in connecting proposed development buildings to the nearest gas station, and the cost involved in connecting proposed development buildings to the nearest water station.

Figure 13F:
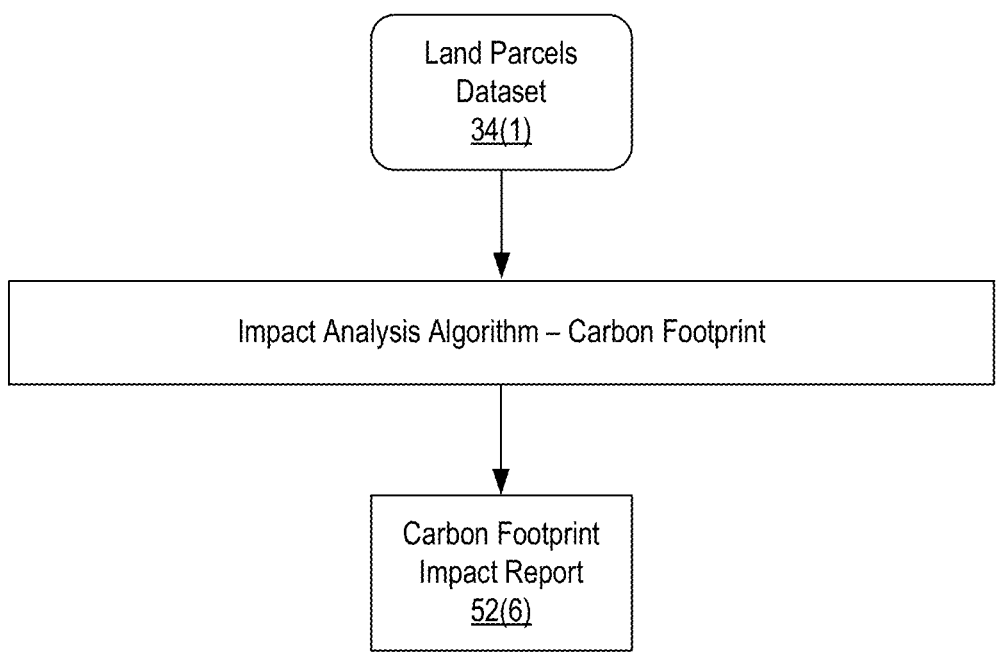

FIG. 13F is a block diagram illustrating land parcels impact analysis and reporting. This analysis will be carried out to calculate the carbon footprint of all buildings in the proposed development. The input source datasets include the land parcels dataset 34(1). Upon processing the input source dataset 34(1) via a carbon footprint impact analysis algorithm, the engine 24 generates a carbon footprint impact report 52(6). The generated carbon footprint impact report 52(6) may include, for example, the number of solar panels that can be fitted on each building in the proposed development, the estimated energy generation for each building taking into consideration the amount of time each building in the proposed development receives sunlight in an year, and the carbon footprint score for each building in the proposed development.

Figure 14:
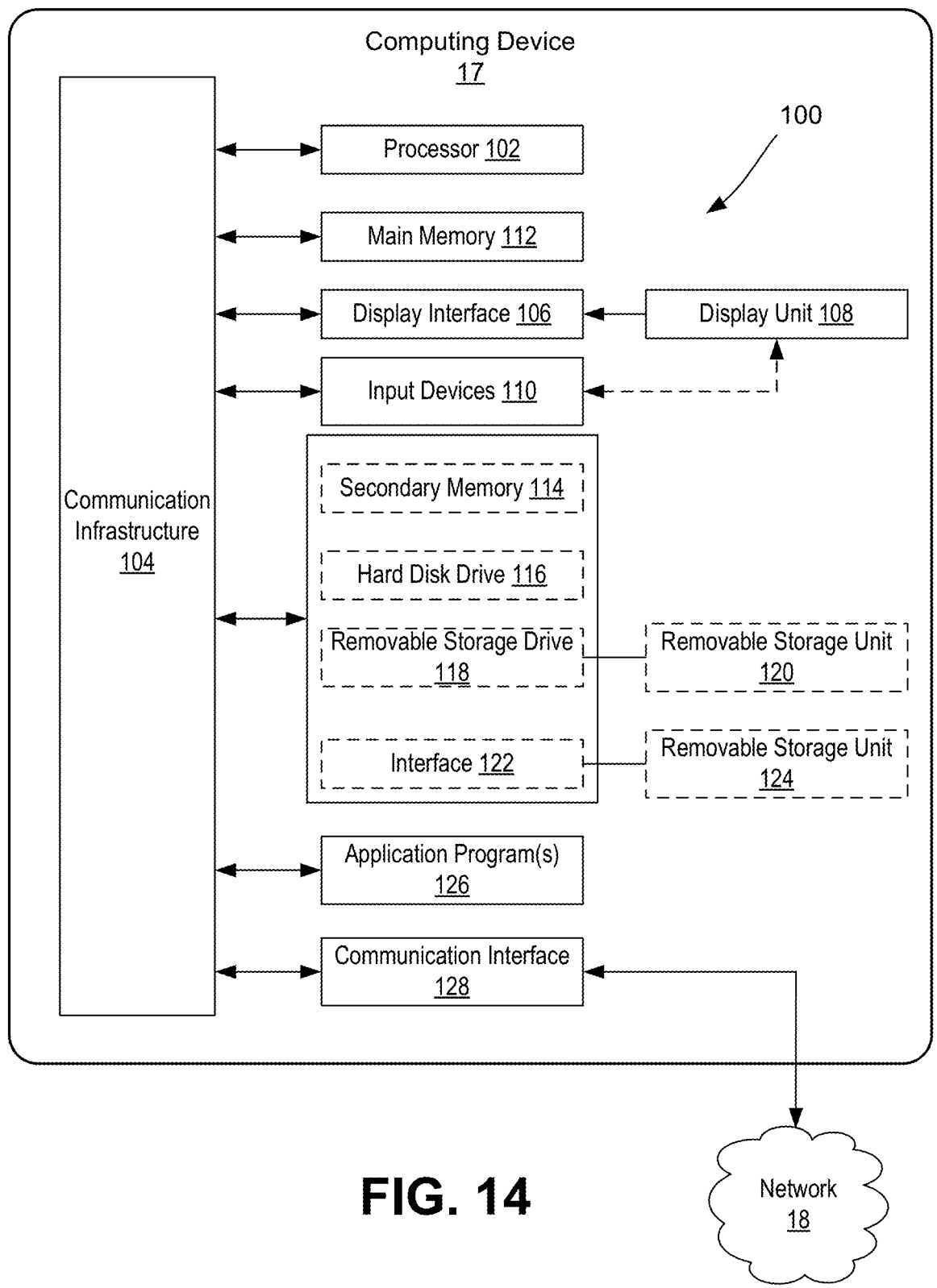
FIG. 14 is a block diagram illustrating one embodiment of a computing device for communicating with the land acquisition and property development analysis platform and providing an interface upon which the user can interact so as to obtain analysis services.

FIG. 14 is a block diagram illustrating one embodiment of a computing device 17 for communicating with the land acquisition and property development analysis platform and providing an interface upon which the user can interact so as to obtain analysis services.

The computing device 17 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the computing device 17, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the computing device 17, such as accessing and interacting with applications executed on the device 17, including an app for providing direct user input with the analysis services offered by the land acquisition and property development analysis platform 12.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the computing device 17 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 318 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the computing device 17 external devices (other computing devices 17, the cloud-based server 14, including the land acquisition and property development analysis platform 12). The communications interface 128 may be configured to use any one or more communication technology and associated protocols, as described above, to effect such communication. For example, the communications interface 128 may be configured to communicate and exchange data with the land acquisition and property development analysis platform 12, and/or one other computing device 17, via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of May 2019, and further versions thereof, and a combination thereof. Examples of communications interface 128 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the computing device 17. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 15:
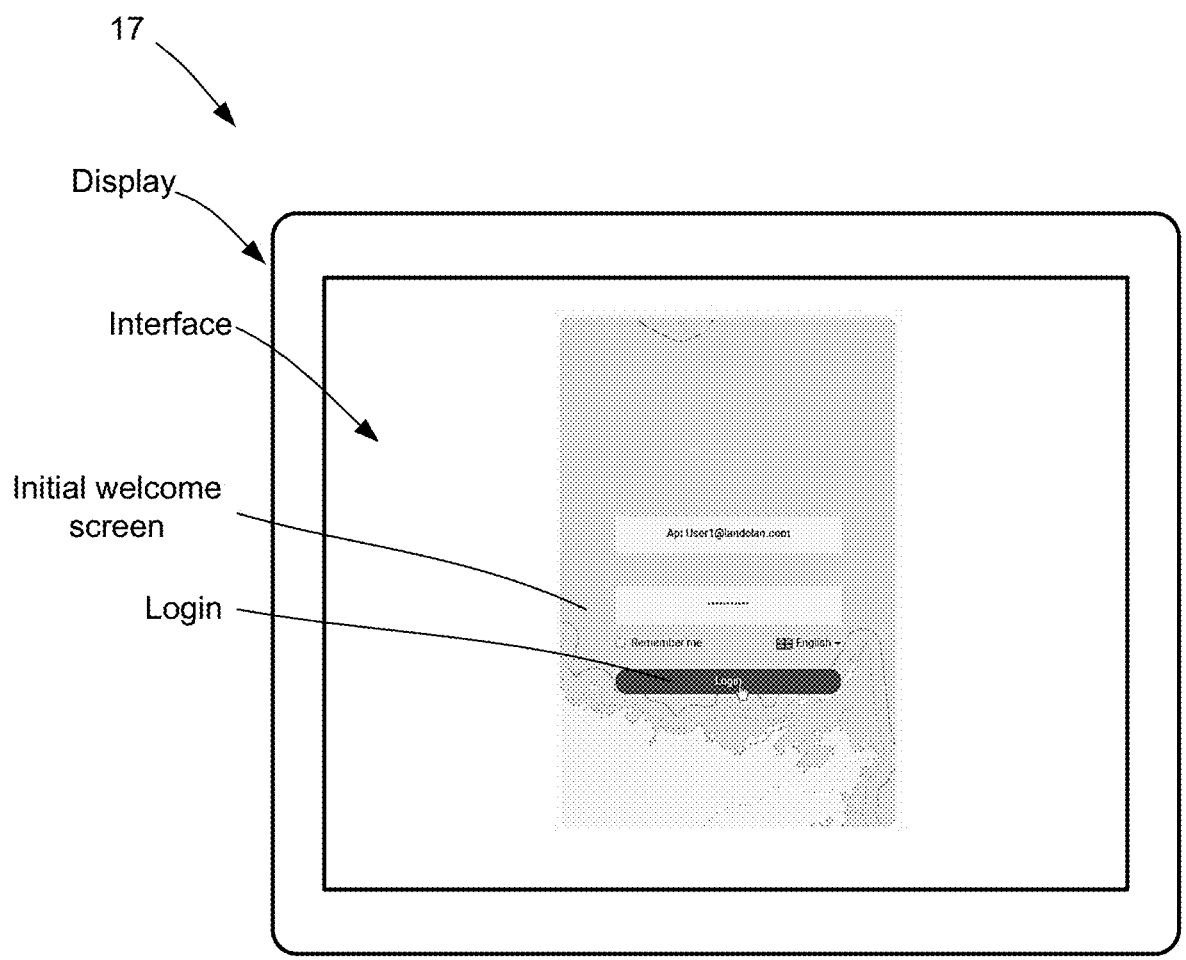
FIG. 15 is a screenshot of an interface on a computing device associated with the analysis services provided by the land acquisition and property development analysis platform of the present disclosure, in which an initial login and/or registration screen is provided.

FIG. 15 is a screenshot of an interface on a computing device associated with the analysis services provided by the land acquisition and property development analysis platform of the present disclosure, in which an initial login and/or registration screen is provided.

Figure 16A:
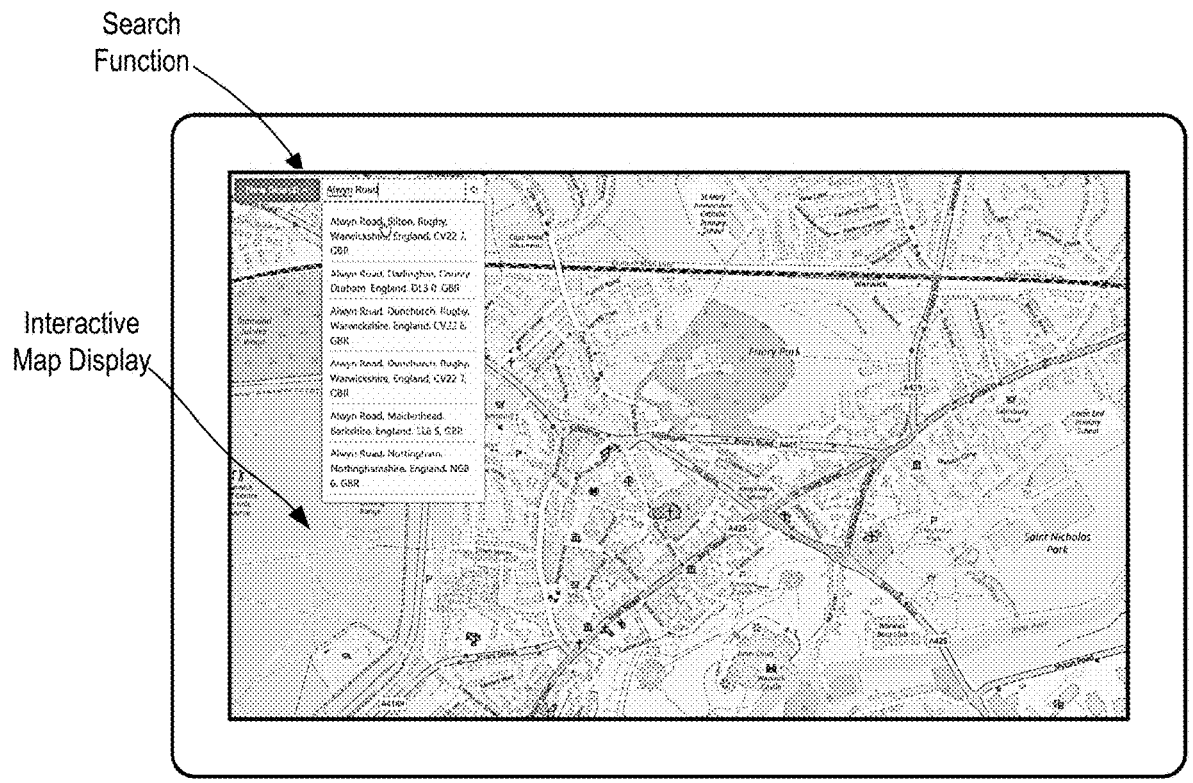
FIGS. 16A, 16B, and 16C are screenshots of an interface displayed on the computing device illustrating user selection of a geographical area of interest (via text-based search and subsequent user-defined boundary) on an interactive map.
Figure 16B:
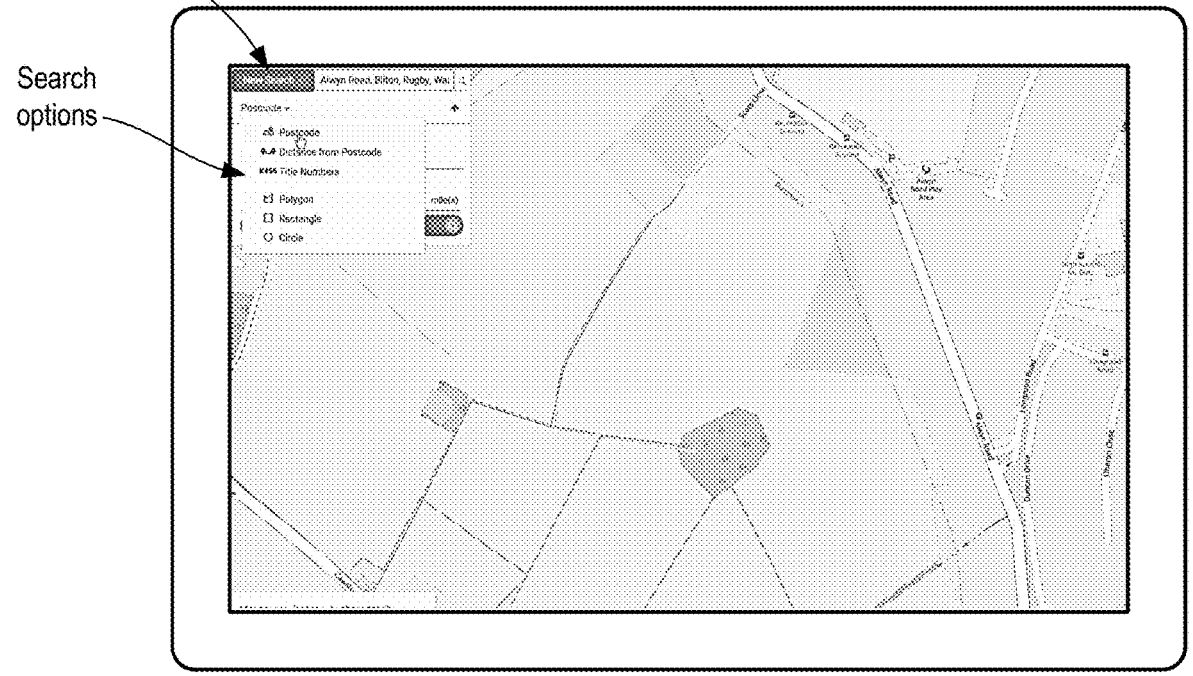
Figure 16C:
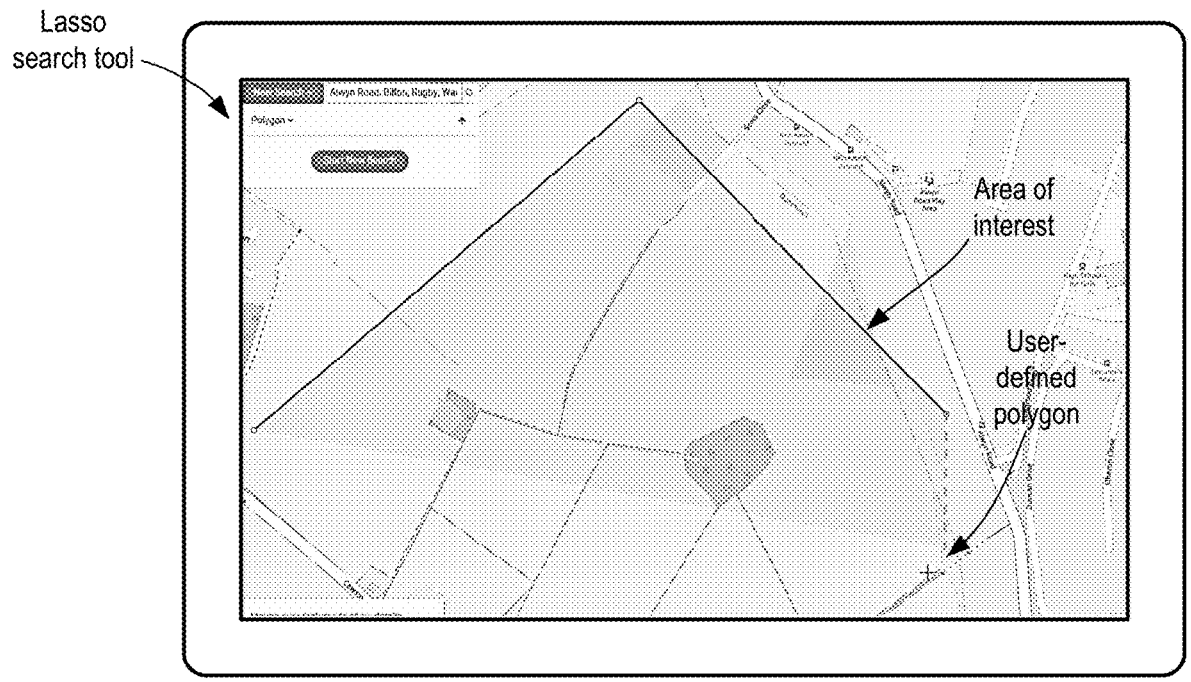

FIGS. 16A, 16B, and 16C are screenshots of an interface displayed on the computing device illustrating user selection of a geographical area of interest (via text-based search and subsequent user-defined boundary) on an interactive map. As shown, the application displays a map using which the user can identify a location to perform top site searches. For example, the digital platform generally provides a web mapping service and outputs, via the interface, an interactive map of a geographical location. As shown, an interactive web map is provided and includes at least one of satellite imagery, aerial photography, and street maps and associated land and structures. The user is able to select a geographical area of interest either by way of a text-based search (i.e., searching an address, geographic coordinates, place of interest, name of building, or the like) or a search based on a user-defined boundary on the interactive map. The user-defined boundary may include a lasso-type search, for example, as shown in FIG. 16C.

Figure 16D:
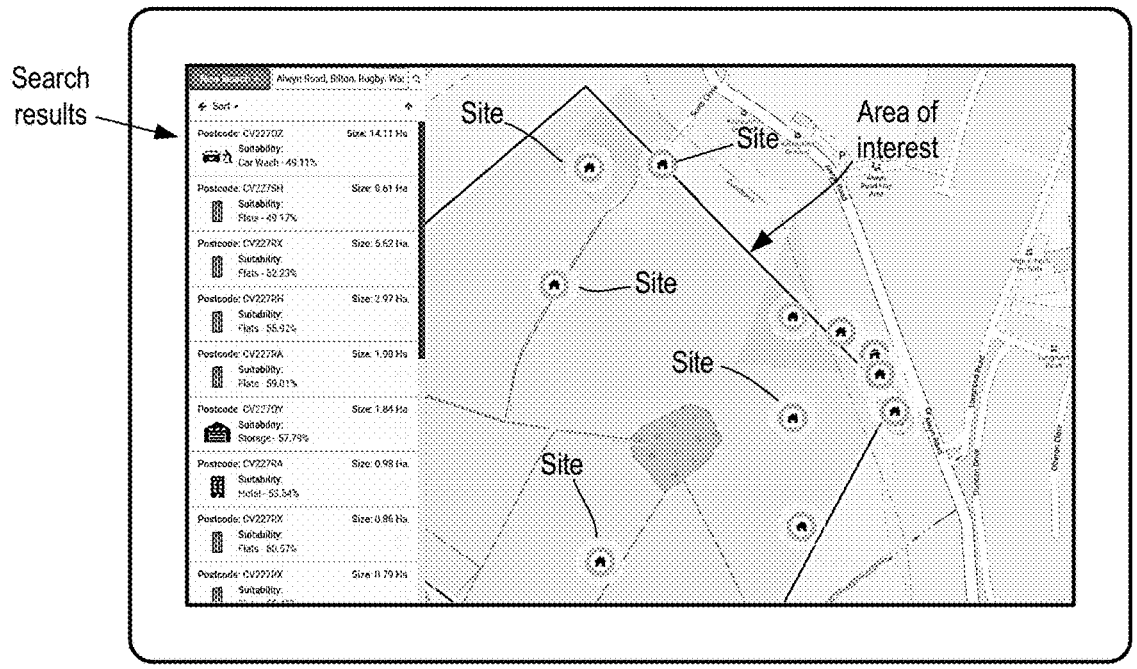
FIG. 16D is a screenshot of an interface displayed on the computing device illustrating sites identified to be located within the user-defined geographical area of interest.

In response to user search of a given area of interest, the platform provides a visual rendering of the area of interest, including a visual indication of sites (land and/or properties) located within the geographical area of interest. For example, as shown in FIG. 16D, all sites determined to be located within the user-defined geographical area of interest are shown. At this point, the user can scroll through and filter the site results, and select on a given site to further obtain additional details about the site.

Figure 16E:
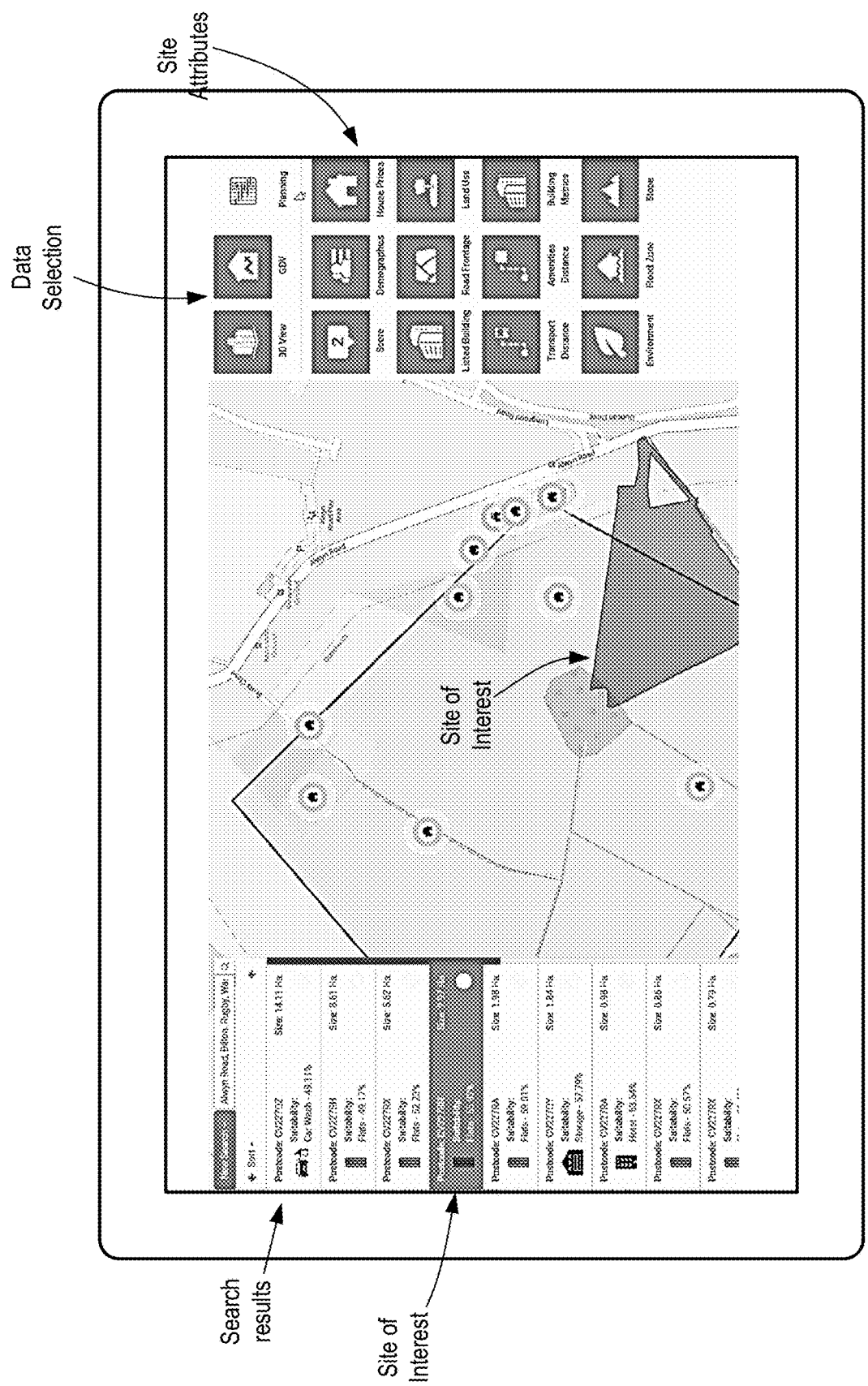
FIG. 16E is a screenshot of an interface displayed on the computing device illustrating user selection of a specific site and the corresponding site-specific data for review, including site attributes/characteristics (i.e., specific information regarding land and/or properties of the selected site, including scoring attributes and categorization data, as well as GDV).
Figure 17D:
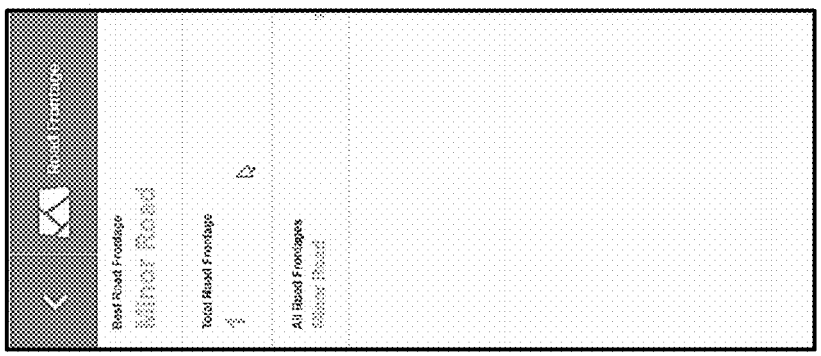
FIGS. 17A-17L are screenshots of various site attributes/characteristics associated with site score, demographics, house prices, road frontage, land use, transport distance, amenities distance, building metrics, environment, flood zone, slope, and GDV, respectively.
Figure 17C:
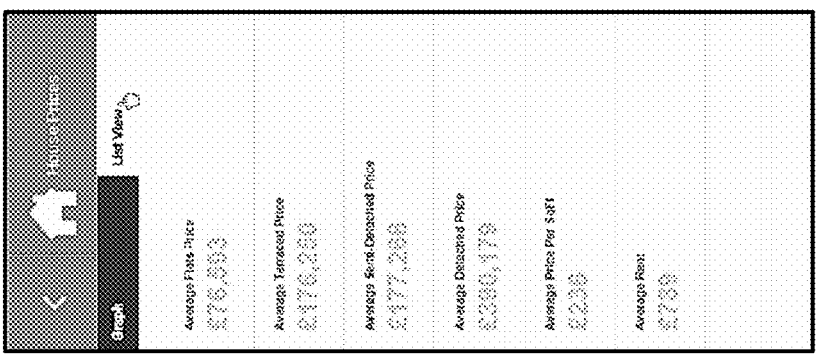
Figure 17B:
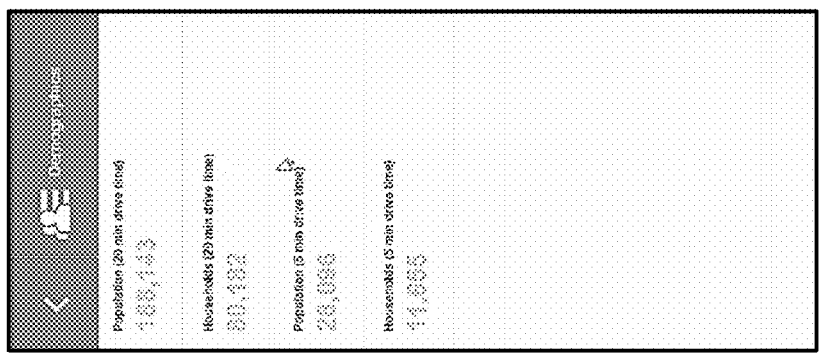
Figure 17A:
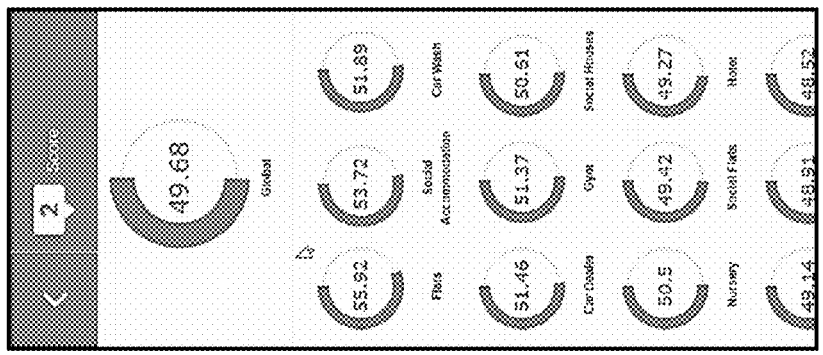
Figure 17H:
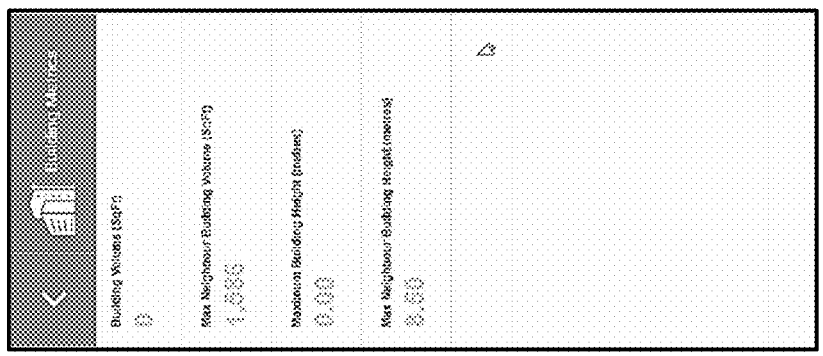
Figure 17G:
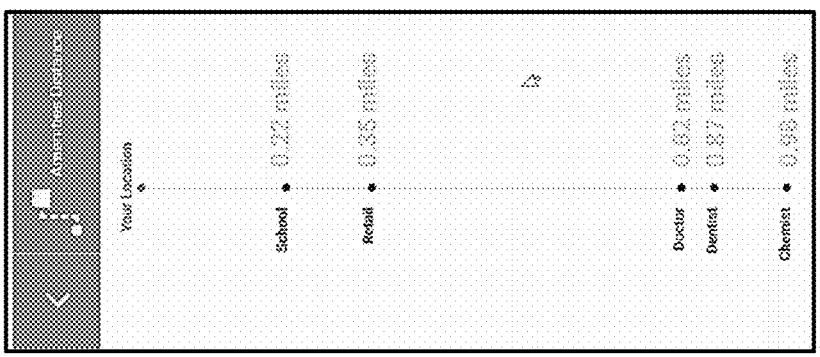
Figure 17F:
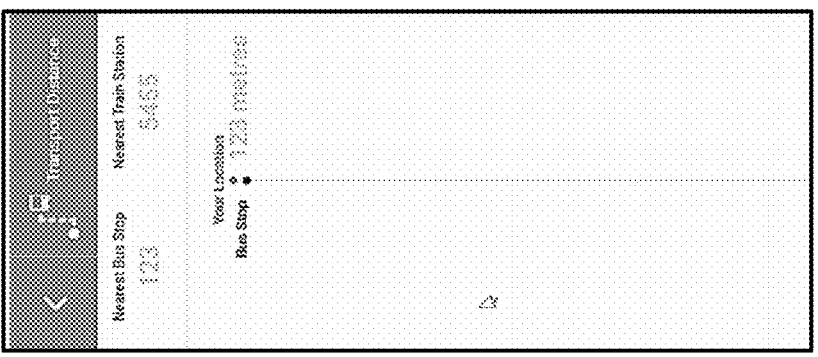
Figure 17E:
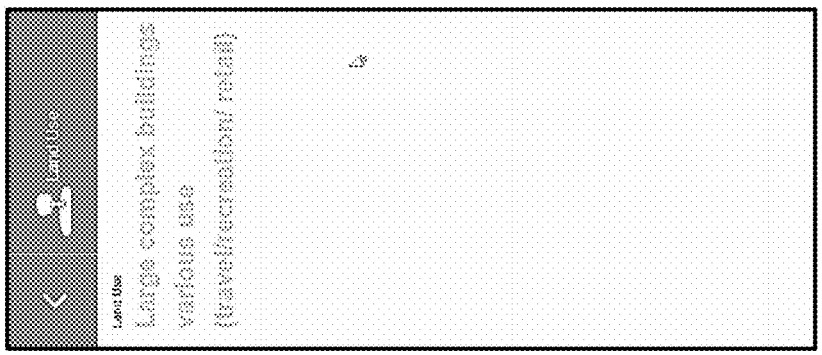
Figure 17L:
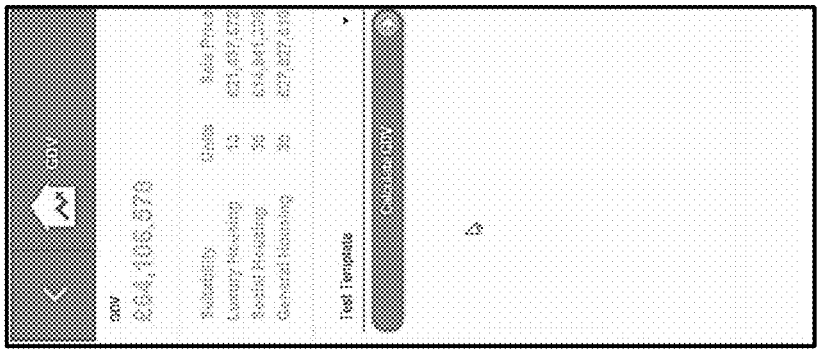
Figure 17K:
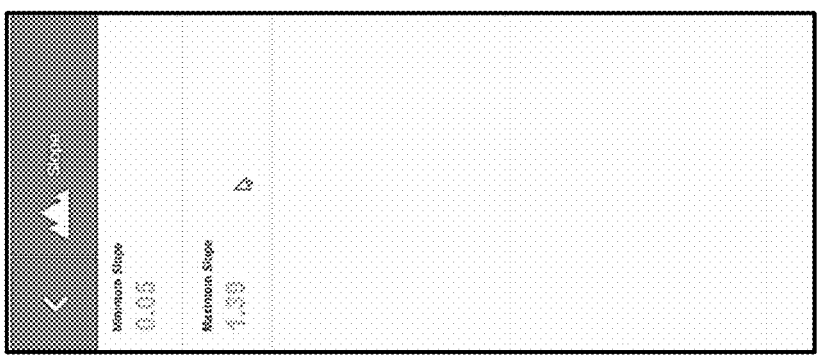
Figure 17J:
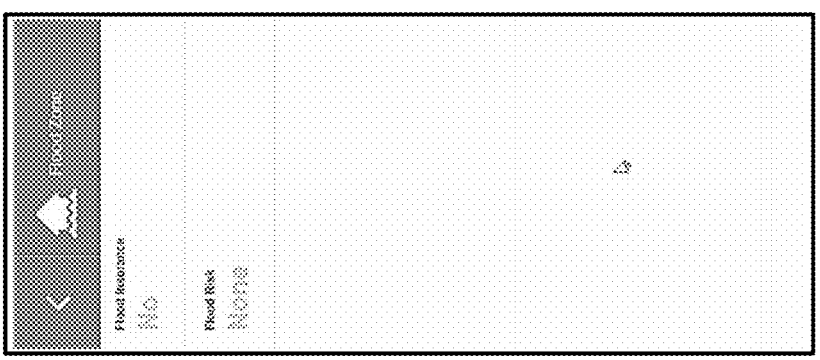
Figure 17I:
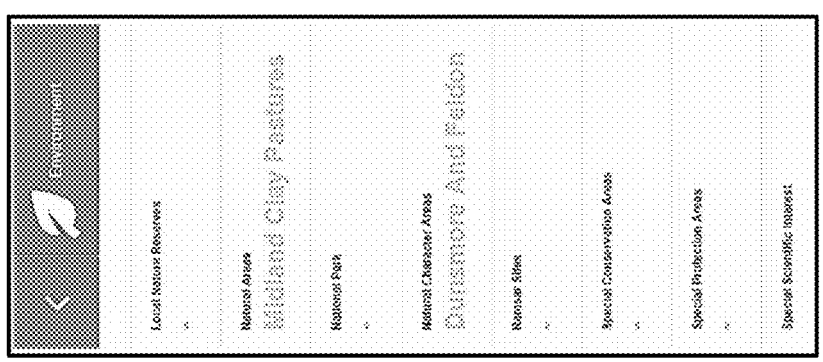

FIG. 16E is a screenshot of an interface displayed on the computing device illustrating user selection of a specific site and the corresponding site-specific data for review, including site attributes/characteristics (i.e., specific information regarding land and/or properties of the selected site, including scoring attributes and categorization data, as well as GDV). Various characteristics of any given site are provided, including relevant land and/or property data. The land and property data may generally be associated with site attributes and site-specific information, which may include, but is not limited to, details regarding site ownership, listing of buildings or structures provided on the site, pricing information for any buildings or structures, including market values, site-specific planning information, local and national government development policy, road and highway information, amenity information (i.e., nearest shops, restaurants, services, etc.), and details regarding the land (i.e., environmental factors, flood zone, slope, etc.), to name a few.

FIGS. 17A-17L are screenshots of various site attributes/characteristics associated with site score, demographics, house prices, road frontage, land use, transport distance, amenities distance, building metrics, environment, flood zone, slope, and GDV, respectively. For example, once a site is selected its detailed attributes can be inspected. The attributes of a site may be grouped into a number of different categories, including: Scores (the score given by the application for various categories like 'Housing', 'Condominium', 'Apartments', 'Care', 'Social Housing', 'Affordable Apartments', 'Luxury Housing', 'Retail', 'Student Accommodation', etc.); House Prices (the average house prices of various types of houses like condominium, apartments, terraced, semidetached and detached); Listed Buildings (this attribute will inform the user if there are any listed buildings within the site; Road Frontage (this attribute will inform the user the best available road frontage to the site and typical road fronts include 'Local Street', 'A-Road', 'B-Road', 'Motorway' etc.); Land Use (this attribute will inform the user the existing land use of the site and typical land use include 'Low density residential', 'Medium density residential', 'High density residential', 'Agriculture', 'Leisure', 'Hotel' etc.); Distance to Transport (this category includes information about distance to nearest bus stop, train station and junction); Distance to Amenities (this category includes information about distance to retail shops, dentist, schools, doctors and chemist); Building Heights (this category includes information about maximum building height available in the site); Environment (this category includes information about various environmental factors like if the site is located in a 'Country Park', 'Local Natural Reserves', 'Conservation Areas', World Heritage' etc.); Flood Zone (this category includes information if the site is located in a flooded area, and if the site is located in a flooded area then the insurance costs would be high); and Slope (this category includes the information about the slope of a site).

The user can further query for the interface to display the sites based on the Gross Domestic Value (GDV). This can be done by selecting a development template and applying on the site results. A typical development template may include, for example, the percentage of site area allocated to social housing, the percentage of site area allocated to condominiums, the percentage of site area allocated to terraced houses, the percentage of site area allocated to semi-detached houses, the percentage of site area allocated to detached houses, and the percentage of site area allocated to greenery and road network.

Figure 18A:
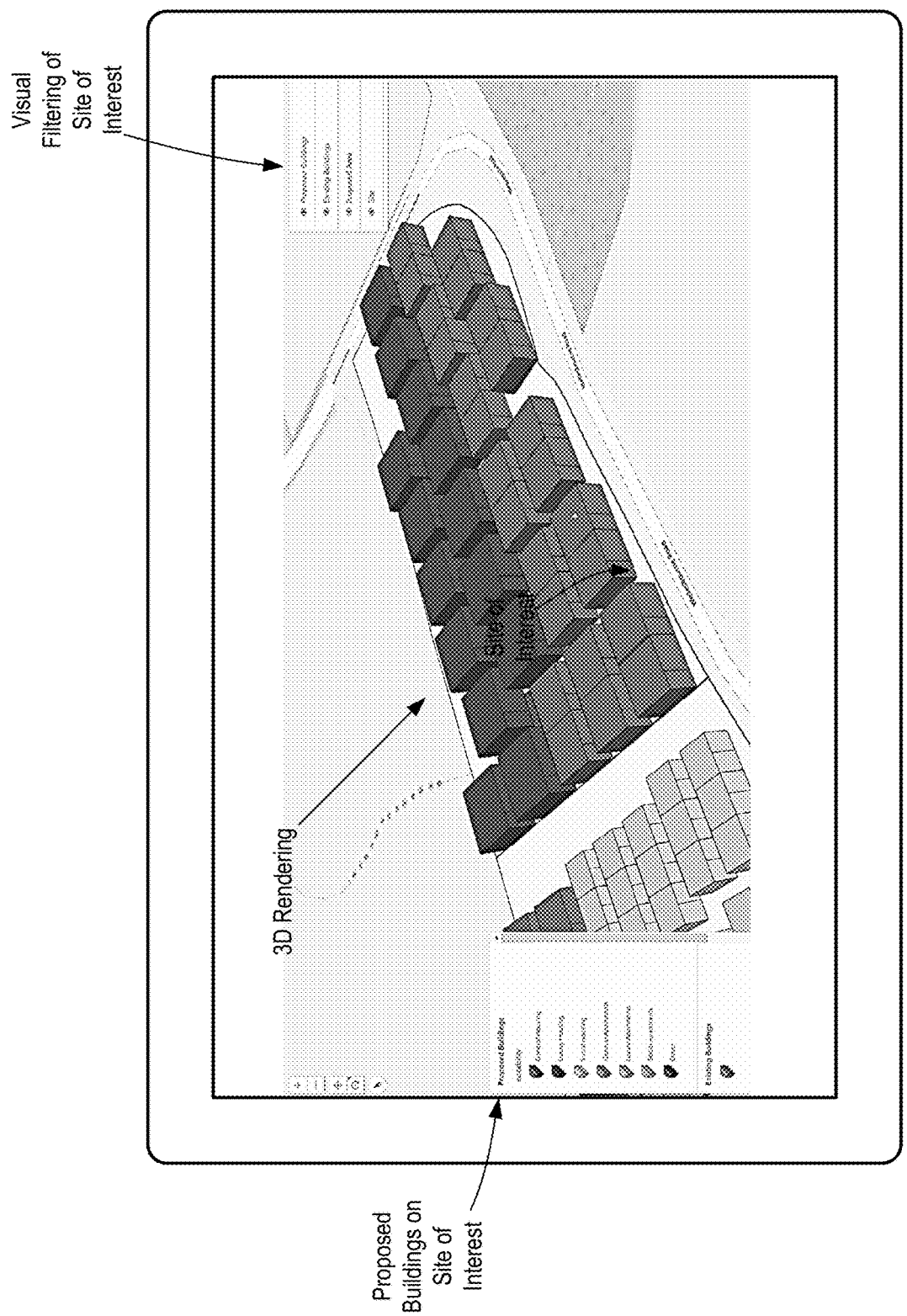
FIGS. 18A and 18B are screenshots of an interface displayed on the computing device illustrating a three-dimensional (3D) rendering of an architectural visualization of potential properties on a given site including property attributes/characteristics.
Figure 18B:
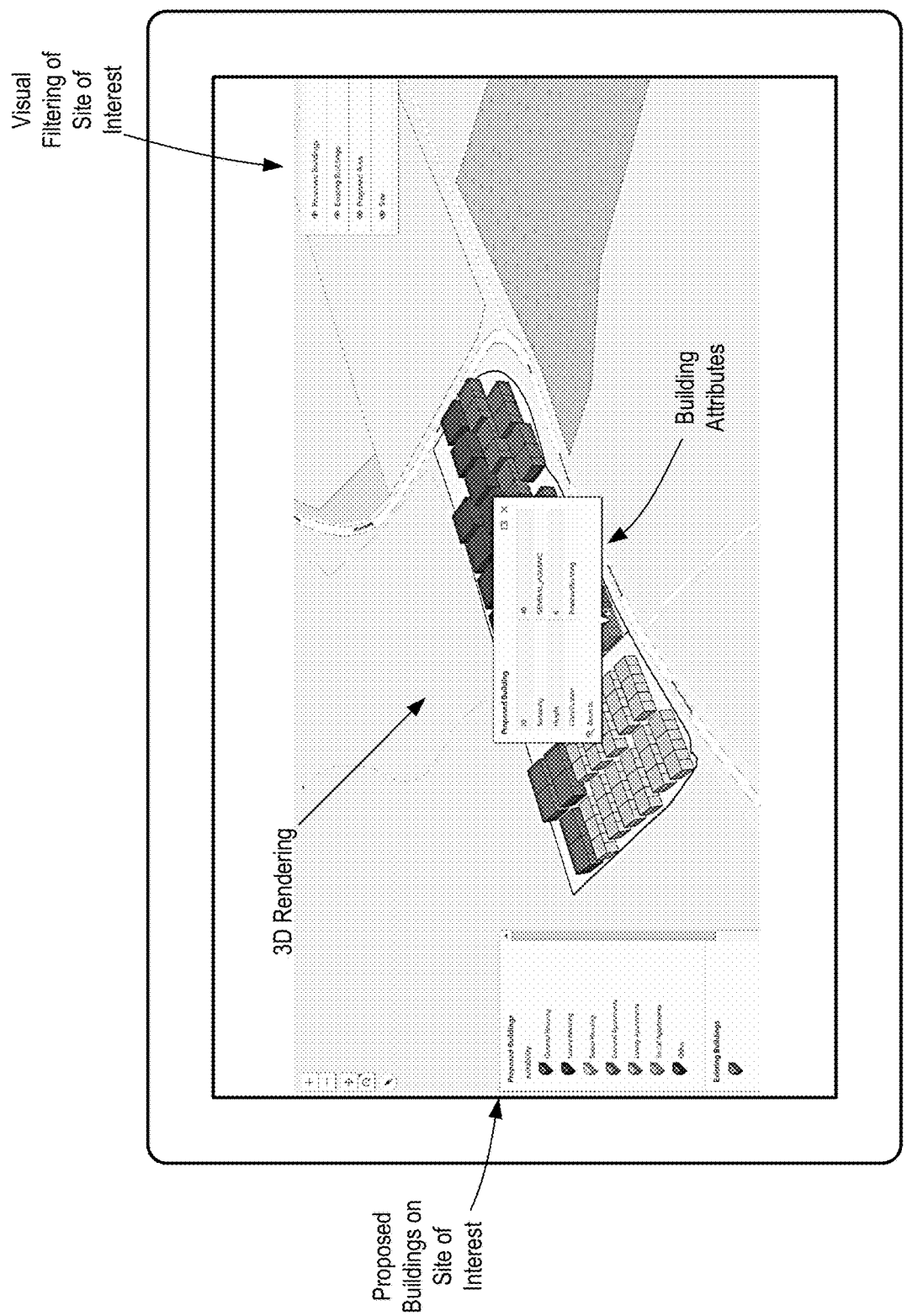

FIGS. 18A and 18B are screenshots of an interface displayed on the computing device illustrating a three-dimensional (3D) rendering of an architectural visualization of potential properties on a given site including property attributes/characteristics. This functionality will provide the end user with an architectural visualization of the proposed buildings on a site. When the end user chooses that site, they will be able to choose which development template to apply. The platform is then able to determine how many units from the selected development template can be accommodated in that location. It will also generate a 3D rendering of the site incorporating at least one of proposed buildings, existing buildings, inferred Roads, greenery features like trees and communal gardens, and other amenities, retail and leisure.

Accordingly, the intelligent, digital platform of the present invention deploys unique artificial intelligence algorithms across a centralized repository (i.e., data lake) consisting of data sets from third-party data sources to score, mine, financially model, and provide 3D visualization of any proposed development site or scheme. The platform essentially collates and provides relevant land and property data available in real, or near-real, time. The platform provides a user with a vast amount of land and property data for any given site in a geographical area of interest, and further provides unique scoring, categorization, impact analysis, and GDV calculations. Accordingly, a user is able to better determine whether any given site within the area of interest is suitable for a given project. As such, the platform of the present invention provides a much more comprehensive analysis of land acquisition and property development opportunities than conventional methods, drastically improving speed and reducing costs compared to conventional due diligence processes.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Incorporation by Reference

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for providing land acquisition and property development analysis services, the system comprising:
    a cloud-based server configured to communicate and exchange data with one or more computing devices over a network, the cloud-based server comprising a hardware processor coupled to non-transitory, computer-readable memory containing instructions executable by the processor to cause the server to:
        provide a cloud-based digital platform comprising an interface with which a user can interact via an associated computing device over the network;
        receive, via a data collection and management module, session data comprising:
            user input with the interface, the user input comprising: a user's selection of a geographical area of interest displayed to the user via a graphical user interface (GUI) of the associated computing device; and user defined rules guiding analysis of the selected geographical area of interest; and
            subsequent return of acquisition and development results for the selected geographical area of interest;

access and read one or more datasets from third party sources based, at least in part, on the session data;
compress in real time, via an in-memory object oriented processing engine and based on a compression algorithm, the one or more datasets from third party sources and store compressed datasets in tiers of cache based, at least in part, on a frequency of usage of compressed datasets;
analyze in real time, via the in-memory object oriented processing engine, the one or more compressed datasets from third party sources, wherein the analysis is based, at least in part, on the user defined rules and a set of scalar and spatial functions;
generate in real time, via the in-memory object oriented processing engine and based, at least in part, on the analysis of the one or more datasets from the third party sources, a plurality of processed datasets associated with one or more sites located within the selected geographical area of interest, wherein each processed dataset comprises information associated with a characteristic of land and/or property of a given site, said characteristic of land and/or property of a given site being determined based on analyses carried out via the in-memory object oriented processing engine for the given site, said analyses selected from the group consisting of proximity amenities analysis, house prices analysis, demographic and industrial analysis, buildings analysis, road frontage analysis, site creation analysis, environmental analysis, slope analysis, and land use analysis;
calculate in real time, via the in-memory object oriented processing engine, a gross development value (GDV) calculation for the one or more sites based, at least in part, on an analysis of one or more processed datasets performed via the in-memory object oriented processing engine for a given site;
output, via a visualization module and to be displayed via the GUI of the computing device, a visual rendering of:
an architectural visualization of potential properties, including property attributes/characteristics, proposed, by the user, to be constructed on at least one of the one or more sites located within the selected geographical area of interest, the architectural visualization comprising a three-dimensional (3D) rendering of one or more properties based, at least in part, on user input with the interface, the user input comprising user selected development template, in which the at least one of the one or more sites is determined, based on the analysis, to be able to accommodate the one or more potential properties;
information associated with a characteristic of land and/or property of a given site; and
a GDV calculation for the one or more sites; and
provide a web mapping service and output, via the visualization module and to be displayed via the GUI of the computing device, an interactive map of a geographical location, wherein a visual rendering of a geographical location comprises map data and/or imagery of the geographical location.

2. The system of claim 1, wherein the user selection of the geographical area of interest comprises either a text-based search or a search based on a user-defined boundary on the interactive map, wherein the text-based search comprises a search for at least one of an address, geographic coordinates, or a place of interest and wherein the user-defined boundary comprises a lasso-type search.

3. The system of claim 2, wherein the processing engine is configured to read one or more datasets from third party sources based on the user selection of the geographical area of interest and user defined rules, the processing engine is further configured to analyze the one or more third party source datasets based, at least in part, on user defined rules, a set of data processing rules, and set of scalar and spatial functions to generate the plurality of processed datasets.

4. The system of claim 3, wherein the third party source datasets comprise data provided by a publicly available or subscription-based data source.

5. The system of claim 3, wherein each processed dataset is associated with a corresponding analysis performed via the processing engine for a given site located within the geographical area of interest and comprises information associated with a characteristic of land and/or property of a given site.

6. A computer-implemented method for providing land acquisition and property development analysis services, the method comprising:
providing a specifically-programmed cloud-based server configured to communicate and exchange data with one or more computing devices over a network;
providing, via the sever, a cloud-based digital platform comprising an interface with which a user can interact via an associated computing device over the network;
receiving, via a data collection and management module associated with the server, session data comprising:
user input with the interface, the user input comprising:
a user's selection of a geographical area of interest displayed to the user via a graphical user interface (GUI) of the associated computing device; and user defined rules guiding analysis of the selected geographical area of interest; and
subsequent return of acquisition and development results for the selected geographical area of interest;
accessing and reading one or more datasets from third party sources based, at least in part, on the session data;
compressing in real time, via an in-memory object oriented processing engine and based on a compression algorithm, the one or more datasets from third party sources and storing compressed datasets in tiers of cache based, at least in part, on a frequency of usage of compressed datasets;
analyzing in real time, via the in-memory object oriented processing engine associated with the server, the one or more compressed datasets from third party sources, wherein the analysis is based, at least in part, on the user defined rules and a set of scalar and spatial functions;
generating in real time, via the in-memory object oriented processing engine associated with the server and based, at least in part, on the analysis of the one or more datasets from the third party sources, a plurality of processed datasets associated with one or more sites located within the selected geographical area of interest, wherein each processed dataset comprises information associated with a characteristic of land and/or property of a given site, said characteristic of land and/or property of a given site being determined based on analyses carried out via the in-memory object oriented processing engine for the given site, said analyses selected from the group consisting of proximity amenities analysis, house prices analysis, demographic and industrial analysis, buildings analysis, road frontage analysis, site creation analysis, environmental analysis, slope analysis, and land use analysis;

calculating in real time, via the in-memory object oriented processing engine and associated with the server, a gross development value (GDV) calculation for the one or more sites based, at least in part, on an analysis of one or more processed datasets performed via the in-memory object oriented processing engine for a given site;

outputting, via a visualization module and to be displayed via the GUI of the computing device, a visual rendering of: an architectural visualization of potential properties, including property attributes/characteristics, proposed, by the user, to be constructed on at least one of the one or more sites located within the selected geographical area of interest, the architectural visualization comprising a three-dimensional (3D) rendering of one or more properties based, at least in part, on user input with the interface, the user input comprising user selected development template, in which the at least one of the one or more sites is determined, based on the analysis, to be able to accommodate the one or more potential properties; information associated with a characteristic of land and/or property of a given site; and a GDV calculation for the one or more sites; and providing a web mapping service and outputting, via the visualization module and to be displayed via the GUI of the computing device, an interactive map of a geographical location, wherein a visual rendering of a geographical location comprises map data and/or imagery of the geographical location.

7. The method of claim 6, wherein the user selection of the geographical area of interest comprises either a text-based search or a search based on a user-defined boundary on the interactive map.

8. The method of claim 7, further comprising reading, via the processing engine of the server, one or more datasets from third party sources based on the user selection of the geographical area of interest and user defined rules, and analyzing, via the processing engine, the one or more third party source datasets based, at least in part, on user defined rules, a set of data processing rules, and set of scalar and spatial functions to generate the plurality of processed datasets.

9. The method of claim 8, further comprising associating each processed dataset with a corresponding analysis performed via the processing engine for a given site located within the geographical area of interest and comprises information associated with a characteristic of land and/or property of a given site.

* * * * *